US009279920B2

(12) United States Patent
Sato et al.

(10) Patent No.: US 9,279,920 B2
(45) Date of Patent: Mar. 8, 2016

(54) REEL BELT OF GAMING MACHINE AND GAMING MACHINE

(71) Applicants: Universal Entertainment Corporation, Koto-ku, Tokyo (JP); Aruze Gaming America, Inc., Las Vegas, NV (US)

(72) Inventors: Motomichi Sato, Tokyo (JP); Tatsuya Teranishi, Tokyo (JP); Kenta Kitamura, Tokyo (JP); Jun Hirato, Tokyo (JP); Takuto Nakayama, Tokyo (JP)

(73) Assignees: UNIVERSAL ENTERTAINMENT CORPORATION, Tokyo (JP); ARUZE GAMING AMERICA, INC., Las Vegas, NV (US)

( * ) Notice: Subject to any disclaimer, the term of this patent is extended or adjusted under 35 U.S.C. 154(b) by 0 days.

(21) Appl. No.: 14/259,030

(22) Filed: Apr. 22, 2014

(65) Prior Publication Data

US 2014/0312565 A1    Oct. 23, 2014

(30) Foreign Application Priority Data

Apr. 22, 2013 (JP) .................................. 2013-089581

(51) Int. Cl.
*A63F 13/90* (2014.01)
*G02B 5/02* (2006.01)
*G07F 17/32* (2006.01)

(52) U.S. Cl.
CPC ............ *G02B 5/0278* (2013.01); *G02B 5/0221* (2013.01); *G02B 5/0231* (2013.01); *G07F 17/3213* (2013.01)

(58) Field of Classification Search
CPC . G07F 17/32; G07F 17/3213; G07F 17/3216; G02B 5/021; G02B 5/0278
USPC .................................................. 463/20, 46, 30
See application file for complete search history.

(56) References Cited

U.S. PATENT DOCUMENTS

| 6,738,112 | B1 * | 5/2004 | Sekiguchi ......... G02F 1/133504 349/63 |
| 7,656,471 | B2 * | 2/2010 | Ota et al. ........................ 349/58 |
| 8,848,133 | B2 * | 9/2014 | Park et al. ....................... 349/65 |
| 2004/0021705 | A1 * | 2/2004 | Baker et al. ...................... 347/2 |
| 2012/0122549 | A1 * | 5/2012 | Rasmussen et al. ............ 463/20 |
| 2012/0276975 | A1 | 11/2012 | Tanimura et al. |

FOREIGN PATENT DOCUMENTS

JP            2003-62152 A      3/2003

* cited by examiner

*Primary Examiner* — Allen Chan
(74) *Attorney, Agent, or Firm* — KMF Patent Services, PLLC; Kenneth M. Fagin, Esq.; S. Peter Konzel, Esq.

(57) ABSTRACT

Provided is a reel unit for a gaming machine which suppresses decrease in visibility of a reel belt due to the formation of image of light source on a reel even if light emission intensity for illuminating the reel is high. It is provided a first light diffusion sheet with translucency having a light refraction surface including a surface formed thereon for refracting light passing therethrough in various directions, the first light diffusion sheet stacked on a base sheet; and a second light diffusion sheet having the light refraction surface, the second light diffusion sheet stacked on the first light diffusion sheet.

12 Claims, 21 Drawing Sheets

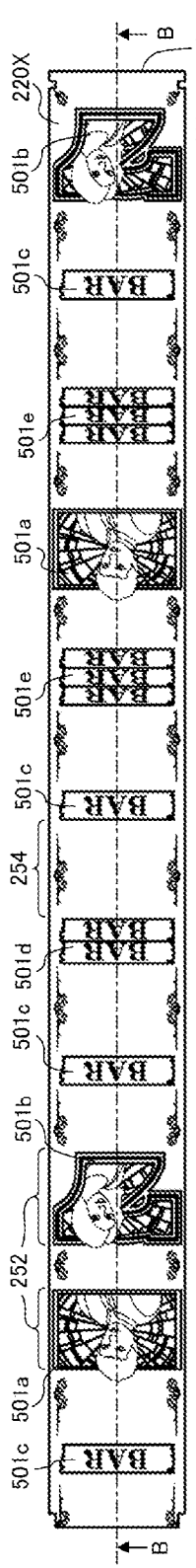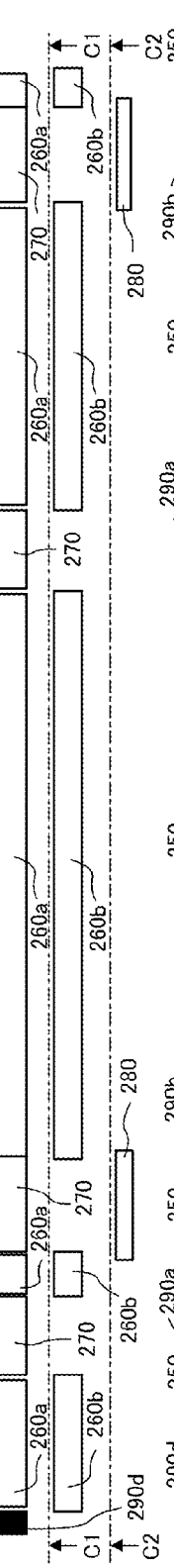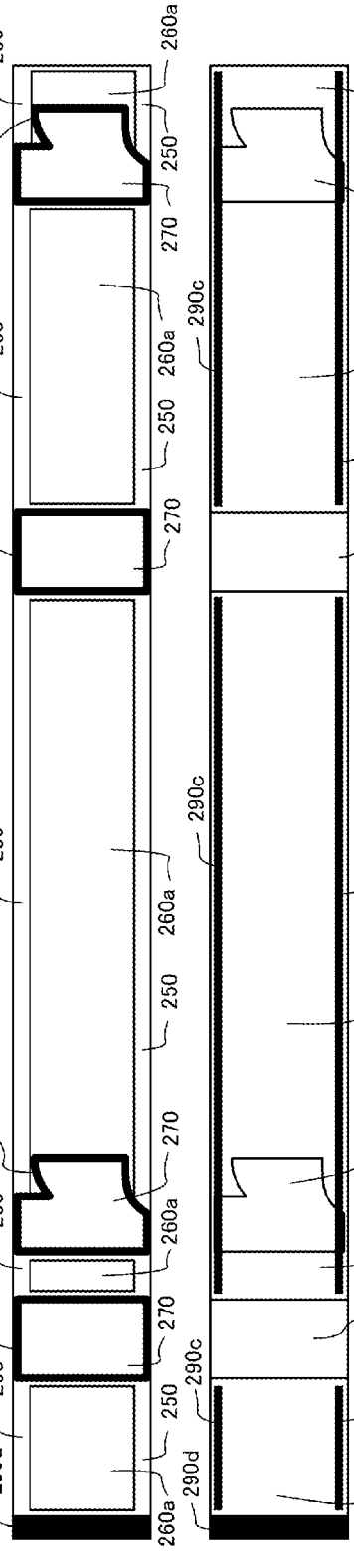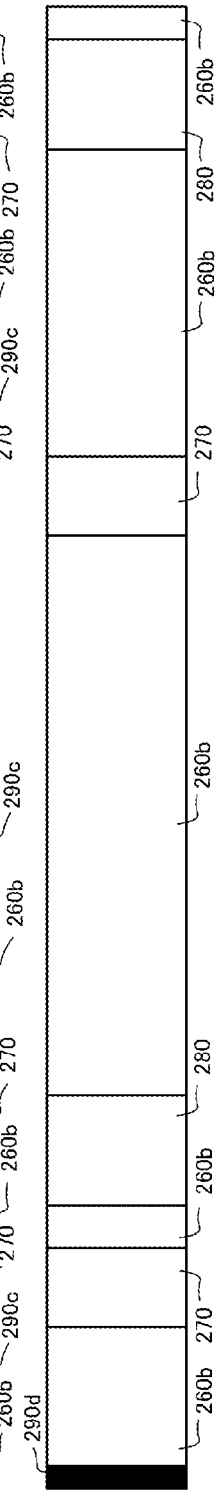

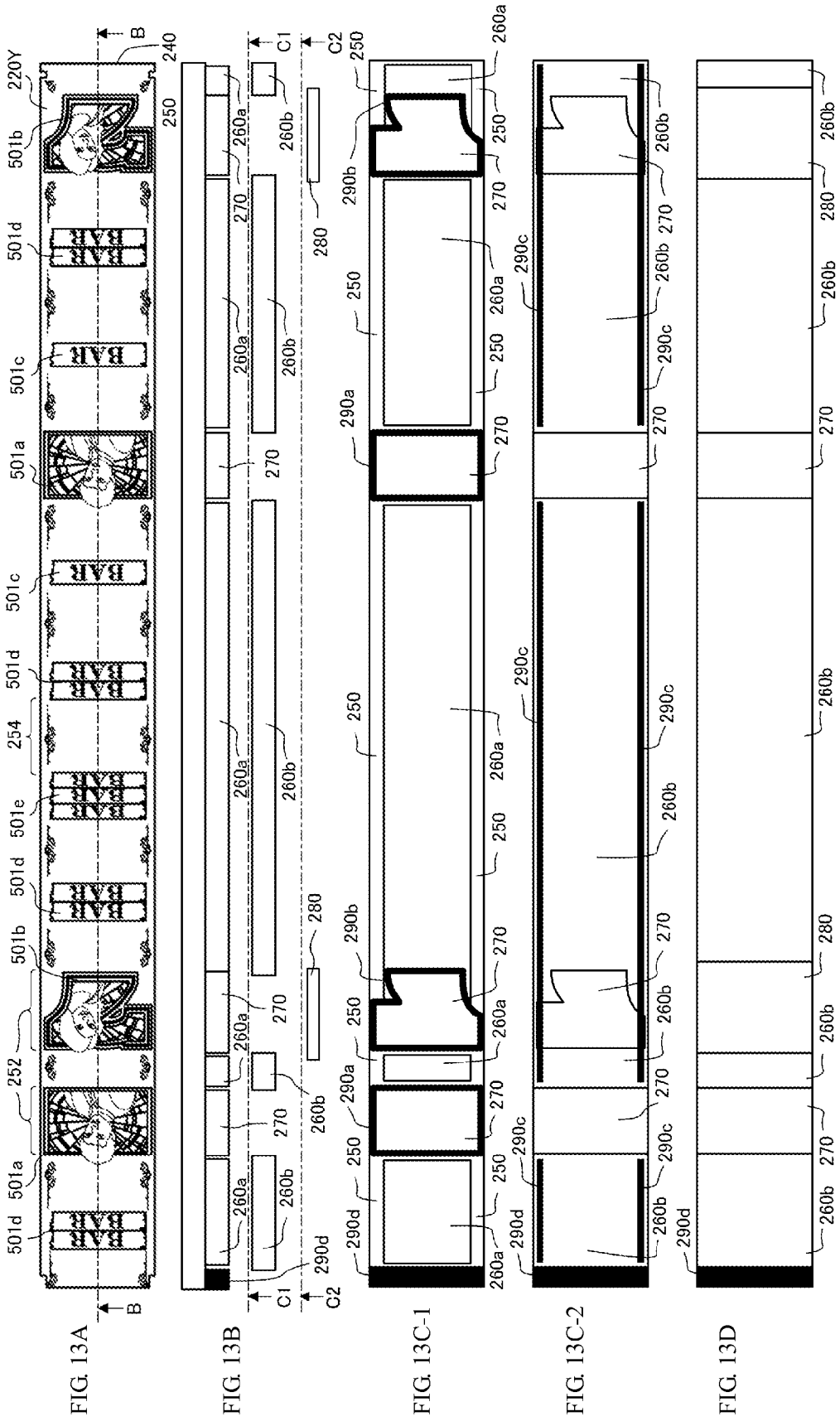

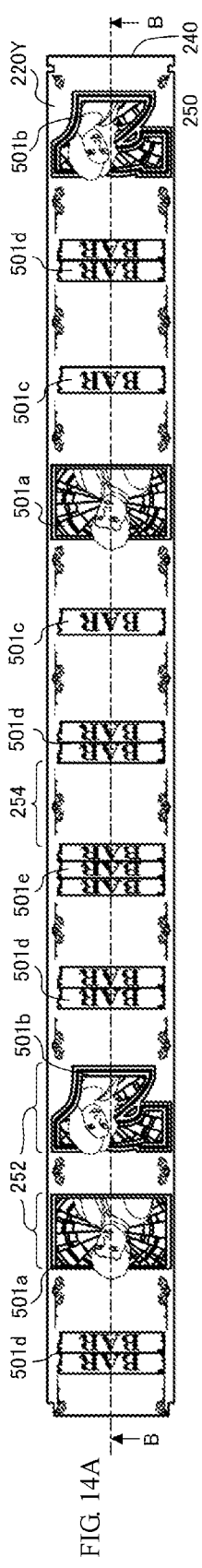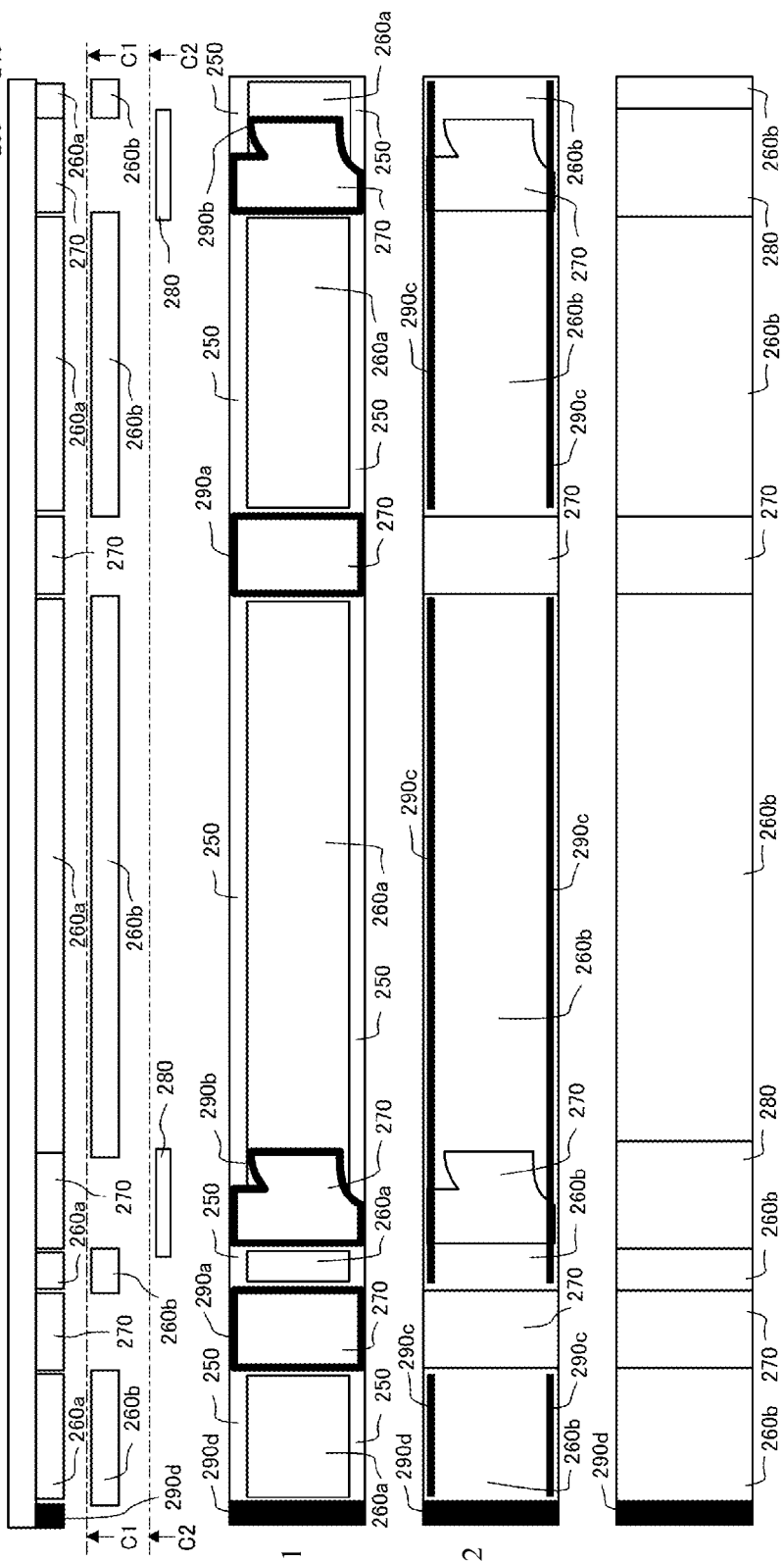

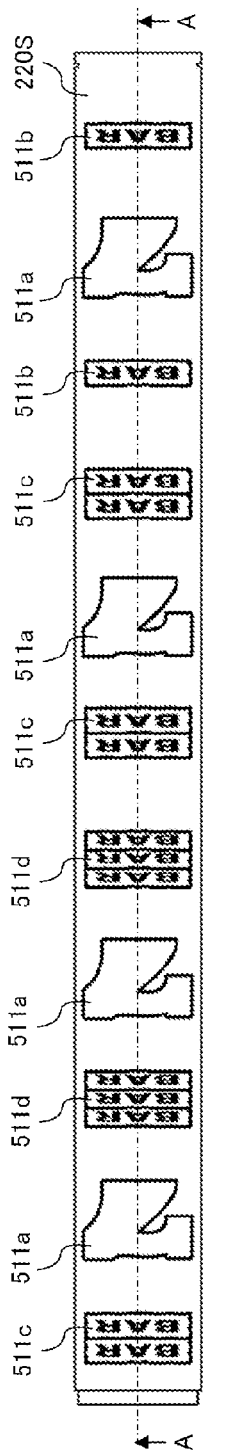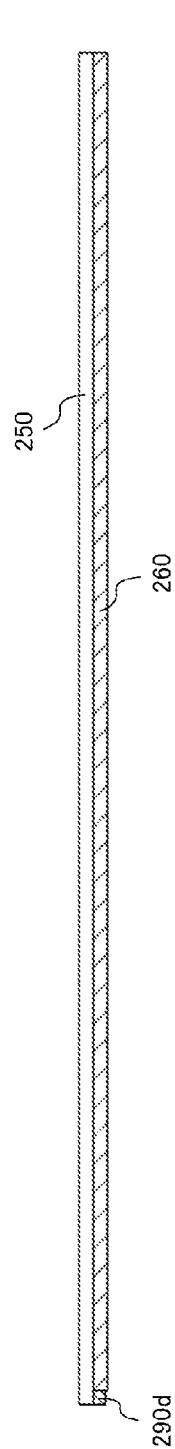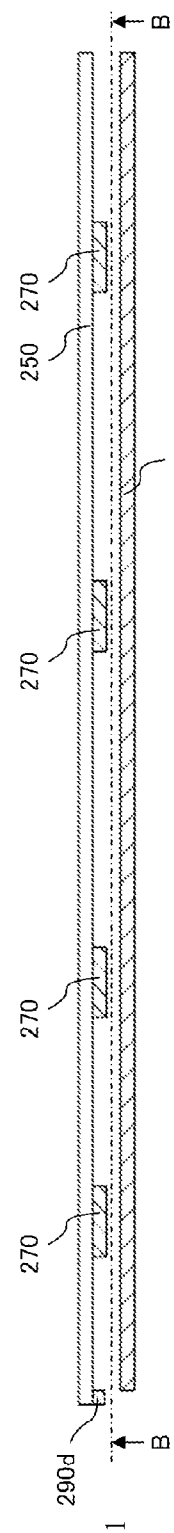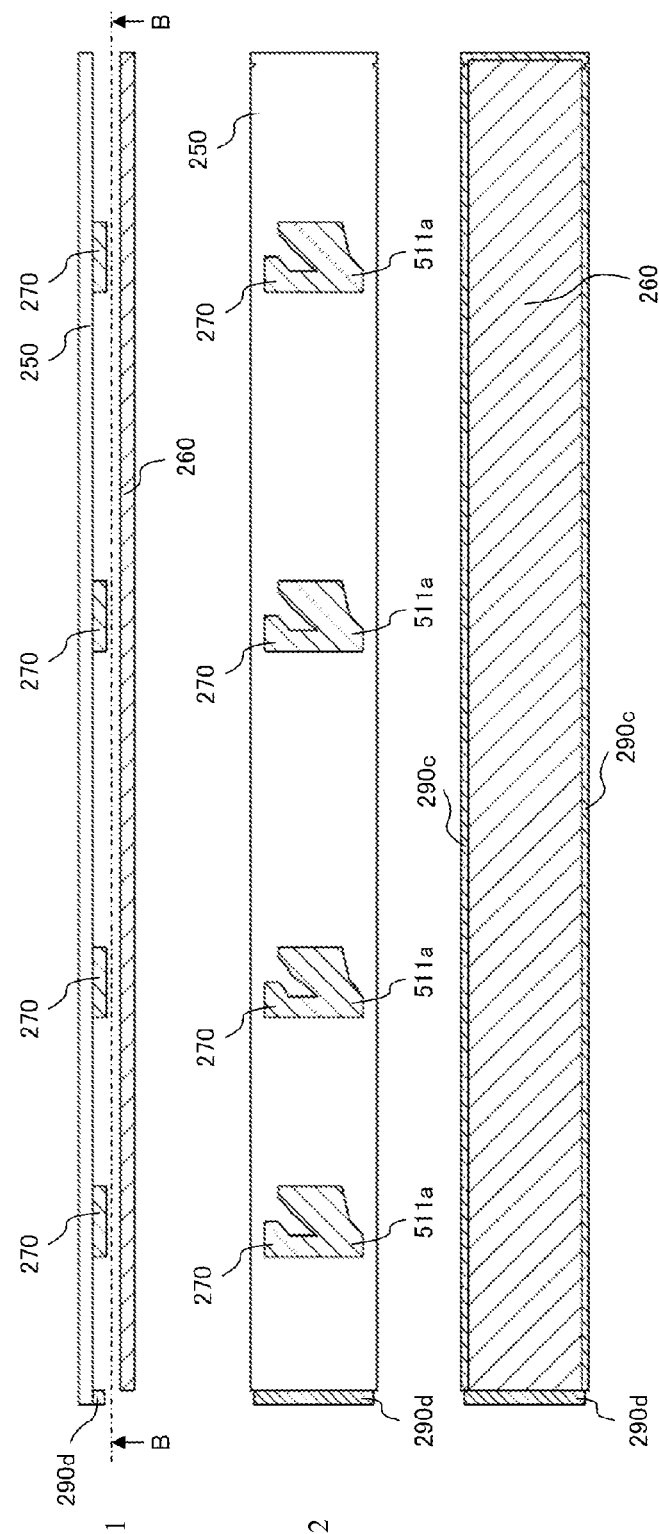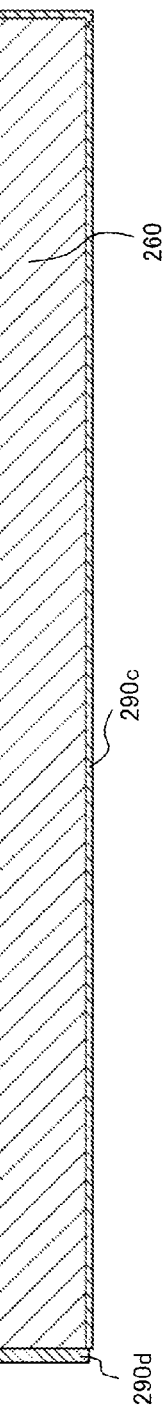
FIG. 17A  FIG. 17B  FIG. 17C-1  FIG. 17C-2  FIG. 17D

REEL BELT OF GAMING MACHINE AND GAMING MACHINE

CROSS-REFERENCE TO RELATED APPLICATIONS

This application is based on and claims a priority from the prior Japanese Patent Application No. 2013-089581 filed on Apr. 22, 2013, the entire contents of which are incorporated herein by reference.

BACKGROUND OF THE INVENTION

1. Field of the Invention

The present invention relates to a reel unit for a rotatable reel of a gaming machine, and more specifically to a reel belt for use in a reel unit of a reel illuminated by a backlight, and a gaming machine provided with the reel unit.

2. Background of the Related Art

Conventionally, a gaming machine has employed a video reel and a mechanical reel in order to display symbols. A video reel is achieved by scrolling a symbol image to display it on a display device such as a liquid crystal display device. The video reel is displayed on the display device, and the luminance of the display device determines visibility of the symbol. In the display device, brightness of a light source such as the luminance on a display screen is previously adjusted to become approximately constant.

A mechanical reel achieves a scroll display of a symbol by mechanically rotating a reel on which the symbol is printed by means of a motor and the like. In the case of the mechanical reel, it is necessary to provide a backlight inside the reel in order to enable a player to visually identify the symbol. Light emitted from the backlight is irradiated on the back of the reel to illuminate the symbol brightly (for example, refer to Japanese Patent Application Laid-open No. 2003-62152 and United State Patent Application Publication No. 2012/0276975).

SUMMARY OF THE INVENTION

A lamp of an LED (light-emitting diode) and the like is employed as a light source of the backlight of the mechanical reel described above. In terms of light emission intensity, electric power saving, preventing the heading, etc., the LED is advantageous in particular. For example, as shown in FIGS. 5 and 15A, a backlight device 300 has four modules 302, and each of the modules 302 has LEDs as being eight light source devices 304 arranged in matrix. In recent years, LEDs increasingly have greater light emission intensity and the directivity of range of light emission becomes higher. Therefore, when the LED is used as a light source to illuminate the reel, the image of LED is more easily to be formed on the reel. For example, as shown by a solid rectangle in FIG. 15B, the image of LED as being the light source 304 may be formed on a reel belt. The backlight device 300 and the light source device 304 are depicted by a phantom line in FIG. 15B. In this manner, in a slot machine in recent years, the possibility of decreasing the visibility of the reel belt has become higher due to the formation of image of LED on the reel.

In view of foregoing, the present invention is made and the purpose thereof is to provide a reel unit for a gaming machine which can suppress the decrease in visibility of a reel belt due to the formation of image of light source on a reel even if light emission intensity for illuminating the reel is high.

A reel belt according to the present embodiment is provided with a first light diffusion sheet with translucency having a light refraction surface including a surface formed thereon for refracting light passing therethrough in various directions, the first light diffusion sheet stacked on a base sheet; and a second light diffusion sheet having a light refraction surface, the second light diffusion sheet stacked on the first light diffusion sheet.

Both a first light diffusion sheet and a second light diffusion sheet are laid on a base sheet. Therefore, the first light diffusion sheet can diffuse light entered into a reel belt in various directions in the first place, and then the second light diffusion sheet can diffuse the diffused light further in various directions. Therefore, image of a light source can become blurred in a wider area, and thus it is possible to prevent the image of the light source from being formed on a reel.

In the reel belt according to the present embodiment, the light refraction surface has projections and depressions on the surface thereof for refracting light; and the light refraction surface of the first light diffusion sheet faces the light refraction surface of the second light diffusion sheet to each other.

Since a light refraction surface of the first light diffusion sheet faces a light refraction surface of the second light diffusion sheet to each other, the projections and depressions can form gaps each of which has the different distance between the sheets from one another at each of their positions. The image of the light source thus can further become blurred.

Furthermore, in the reel belt according to the present embodiment, the base sheet and the second light diffusion sheet have both ends formed along the longitudinal direction; and a hollow is formed by joining both the ends of the base sheet and both the ends of the second light diffusion sheet opposite to each other, the base sheet and the second light diffusion sheet stacked to each other.

Both the ends of the second light diffusion sheet are joined indirectly or directly to both the ends of the base sheet. Therefore, it is possible to maintain the first light diffusion sheet, the second light diffusion sheet and the base sheet in a state of being stacked to one another while ensuring the formation of the gaps having the distance different from one another at each of their positions between the first light diffusion sheet and the second light diffusion sheet. The image of a light source can become further blurred in a wider area even if the light source having light emission intensity is arranged behind the reel belt, for example.

In the reel belt according to the present embodiment, both the ends of the first light diffusion sheet have a first width along the direction perpendicular to the longitudinal direction;

both the ends of the second light diffusion sheet include two ends formed in the longitudinal direction to be opposite to each other having a distance therebetween, and have a second width along the direction perpendicular to the longitudinal direction, the second width wider than the first width; and the first light diffusion sheet is arranged between both the ends of the second light diffusion sheet.

The first light diffusion sheet has a first width, and the second light diffusion sheet has a second width wider than the first width. Therefore, the first light diffusion sheet can be arranged in the areas between two ends of the second light diffusion sheet. Such an arrangement makes it possible to form the state where the first light diffusion sheet is not joined to the second light diffusion sheet in the area between the two ends. Therefore, it is possible to prevent the first light diffusion sheet from being brought into closed contact with the second light diffusion sheet, and to form the gaps having the distance different from one another at each of their positions between the first light diffusion sheet and the second light diffusion sheet. The image of the light source thus can become further blurred.

The reel belt according to the present embodiment is further provided with a light refraction sheet with translucency having another light refraction surface for refracting light passing therethrough so as to be different from the light refraction surface, the light refraction sheet stacked on a symbol forming area on said base sheet including a symbol formed thereon.

A light refraction sheet is stacked on a symbol forming area, and thus the symbol forming area can be illuminated so as to be different from other areas than the symbol forming area. It is thus possible to give an accent to a symbol.

Furthermore, in the reel belt according to the present embodiment, another light refraction surface has projections and depressions different from those on the light refraction surface.

Another light refraction surface has projections and depressions on the surface thereof which are different from those on the light refraction surface, and thus the symbol forming area can be illuminated so as to be different from other areas.

Furthermore, a gaming machine according to the present embodiment is provided with a reel assembly having a rotatable reel and a backlight illuminating said reel from the inside, wherein:

said reel has a reel belt comprising:

a first light diffusion sheet with translucency having a light refraction surface including a surface formed thereon for refracting light emitted from the backlight in various directions, the first light diffusion sheet stacked on a base sheet; and a second light diffusion sheet having a light refraction surface, the second light diffusion sheet stacked on said first light diffusion sheet.

It is possible to diffuse light emitted from the backlight in various directions by the first light diffusion sheet, and then to diffuse the diffused light further in various directions by the second light diffusion sheet. Therefore, the image of the light source thus can become blurred in a wider area, and the image of the light source can be prevented from being formed on the reel.

Furthermore, in the gaming machine according to the present embodiment, said base sheet and said second light diffusion sheet have both ends formed along the longitudinal direction;

a hollow is formed by joining both the ends of said base sheet and both the ends of said second light diffusion sheet opposite to each other, the base sheet and the second light diffusion sheet stacked to each other; and said backlight is arranged between said both the ends.

Both the ends of the second light diffusion sheet are joined indirectly or directly to both the ends of the base sheet. Therefore, it is possible to maintain the first light diffusion sheet, the second light diffusion sheet and the base sheet in a state of being stacked to one another while ensuring the formation of the gaps having the distance different from one another at each of their positions between the first light diffusion sheet and the second light diffusion sheet. The image of a light source can become further blurred in a wider area even if the light source having light emission intensity is arranged behind the reel belt, for example.

Furthermore, since the backlight is arranged between two ends of the second light diffusion sheet, the image of the backlight is not formed at the two ends even if the first light diffusion sheet comes into close contact with the second light diffusion sheet at the two ends thereof. Therefore, visibility of the reel belt is not decreased.

Furthermore, in the gaming machine according to the present embodiment, said base sheet and the second light diffusion sheet are joined by an adhesive.

An adhesive can be introduced into the projections and depressions for refracting light, and thus the base sheet and the second light diffusion sheet can be adequately joined to each other.

Furthermore, in the reel belt according to the present embodiment, the second light diffusion sheet has a light refraction surface same as the light refraction surface of the first light diffusion sheet.

The first light diffusion sheet and the second light diffusion sheet which have the same light refraction surfaces as each other are used along with each other, so that the light diffused by the first light diffusion sheet can be further diffused with a similar aspect.

Furthermore, the reel belt according to the present embodiment, the second light diffusion sheet has a light refraction surface with translucency, the light refraction surface different from said light refraction surface of said first light diffusion sheet.

The first light diffusion sheet and the second light diffusion sheet which have the different light refraction surfaces from each other are used along with each other, so that the light can be diffused with a different aspect from that of the first light diffusion sheet. More specifically, since the second light diffusion sheet has the light diffusion surface different from the light diffusion surface of the first light diffusion sheet, the light can be diffused with a different aspect from that of the light diffused by the first light diffusion sheet. More specifically, it is possible not only to blur the image of the light source, but also to actively form a specific diffusion pattern such as a geometric pattern, thereby enhancing the effect by the backlight.

Furthermore, the reel belt according to the present embodiment, the second light diffusion sheet is stacked on the symbol forming area on the base sheet including a symbol formed thereon.

The second light diffusion sheet is stacked on the symbol forming area. More specifically, the first light diffusion sheet and the second light diffusion sheet are stacked only in the symbol forming area. As described above, when the first light diffusion sheet and the second light diffusion sheet are used which have the different light refraction surfaces from each other, a predetermined diffusion pattern can be formed. Therefore, it is preferable to light the backlight to form a predetermined diffusion pattern when the symbol (the symbol forming area) on which the second light diffusion sheet is stacked passes in front of the backlight, and to extinguish the backlight to form a predetermined diffusion pattern when the symbol has finished passing in front of the backlight. In this manner, it is possible to form and clear the predetermined pattern in accordance with passage of the symbol.

Furthermore, in the reel belt according to the present embodiment, light emitted from the backlight is diffused by the first light diffusion sheet and the second light diffusion sheet to form diffused light with a diffusion pattern, thereby illuminating said reel belt;

rotation of the reel provides a first state where visible recognition of the diffusion pattern is made easier than the visible recognition of the symbol; and stop of the reel provides a second state where visible recognition of the symbol is made easier than the visible recognition of the diffusion pattern.

The diffusion pattern is formed by the light emitted from the backlight. Therefore, the diffusion pattern appears always at a given position irrespective of the rotation operation of the reel. On the other hand, the symbol moves along with the rotation operation of the reel.

As described above, it is preferable to light the backlight when the symbol passes, and to extinguish the backlight when the symbol has finished passing. The symbol is moving while the reel is rotating, so that it is difficult for a player to visibly recognize the symbol even if the backlight is lighted. On the other hand, the diffusion pattern appears always at a given position by lighting the backlight irrespective of the rotation operation of the reel. It thus becomes easier for the player to visibly recognize not the symbol but the diffusion pattern. In this manner, the diffusion pattern resultingly becomes more observable than the symbol when the reel is rotated.

Furthermore, when the reel is stopped, the backlight is lighted to indicate the stopped symbol. Therefore, the diffusion pattern appears even in the state where the reel is stopped as long as there is a symbol (symbol forming area). Therefore, when the reel is stopped, the stopped symbol and the diffusion pattern are stacked with each other. However, since characters and drawing design constituting the symbol are clearly displayed when the symbol is stopped, it becomes easier for the player to visibly recognize not the diffusion pattern but the symbol. In this manner, the symbol resultingly becomes more observable than the diffusion pattern when the reel is stopped.

Furthermore, it may be able to visibly recognize by the player not the symbol itself but the light emission pattern (such as the light diffusion pattern) different from the symbol by using the light emitted from the backlight.

Yet further, the gaming machine according to the present embodiment is preferably provided with a front light for illuminating the reel from the outside. Since the reel is illuminated from the outside, it is possible to visibly recognize the symbol and the like easily even in the case where the backlight is extinguished.

It is possible to suppress the decrease in visibility of a reel belt due to the formation of image of light source on a reel.

BRIEF DESCRIPTION OF THE DRAWINGS

FIG. 6A is a front view showing a surface of a reel belt 222X, FIGS. 6B, 6C-1 and 6C-2 are vertical cross sectional views thereof, and FIG. 6D is a backside view thereof.

FIGS. 10A, 10B-1, 10B-2 and 10C are diagrams showing a symbol forming area 252 in which a symbol 501b is formed.

FIG. 13A is a front view showing a structure of a reel belt 222Y, FIGS. 13B, 13C-1 and 13C-2 are vertical cross sectional views thereof, and FIG. 13D is a backside view thereof.

FIG. 14A is a front view showing a structure of a reel belt 222Z, FIGS. 14B, 14C-1 and 14C-2 are vertical cross sectional views thereof, and FIG. 14D is a backside view thereof.

FIG. 17A is a front view showing the front surface of a reel belt 222S, FIG. 17B is a side view thereof, FIGS. 17C-1 and 17C-2 are cross sectional views thereof, and FIG. 17D is a rear view thereof.

DESCRIPTION OF PREFERRED EMBODIMENTS

Embodiments will be described below based on drawings.

First Embodiment

Overview of Gaming Machine 10

Figure 1:
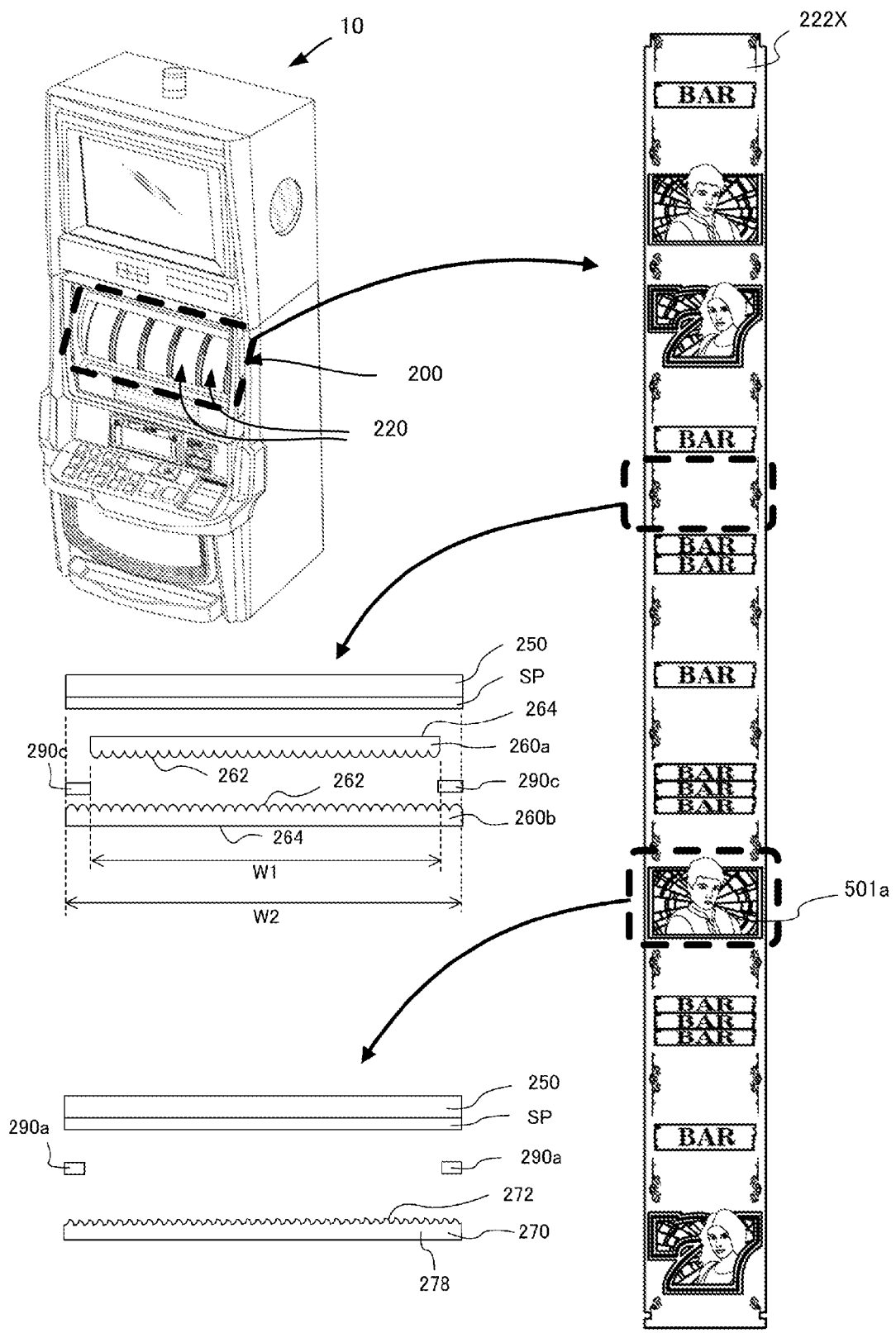
FIG. 1 is a diagram showing an overview of a reel belt according to the present embodiment.

FIG. 1 is a diagram showing an overview of a reel belt of a gaming machine 10 according to the present embodiment.

A reel belt (such as three types of reel belts 222X, 222Y and 222Z described below) according to the present embodiment is a reel belt attached to a rotatable reel (such as reels 220a, 220b, 220c, 220d and 220e described below) of a gaming machine (such as a gaming machine 10 described below), including:

a first light diffusion sheet (such as a light diffusion sheet 260a described below) with translucency having a light refraction surface (such as a first surface 262 described below) (one light refraction surface or a first light refraction surface) including a surface formed thereon for refracting light passing therethrough in various directions, the first light diffusion sheet stacked on a base sheet; and a second light diffusion sheet (such as a light diffusion sheet 260b) having a light refraction surface (one light refraction surface or a first light refraction surface), the second light diffusion sheet stacked on the first light diffusion sheet.

In the first place, light emitted from a light source enters into a first light diffusion sheet, and then is refracted in various directions. Then, the light refracted in various directions by the first light diffusion sheet enters into a second light diffusion sheet, and then refracted in various directions. Furthermore, the light refracted in various directions by the second light diffusion sheet enters into a base sheet. As described above, the light emitted from the light source is refracted in a variety of direction by both the first light diffusion sheet and the second light diffusion sheet until it enters into the base sheet. In addition, the base sheet is a sheet to be a base part or a base material of a reel belt, and is a sheet on which the first light diffusion sheet and the second light diffusion sheet are provided stacked thereon.

Therefore, the light entering into the base sheet can be refracted in various directions by both the first light diffusion sheet and the second light diffusion sheet, and the image of the light source can become blurred in a wide area. The image of the light source can be prevented from being formed on the reel.

Furthermore, in the reel belt according to present embodiment, the light refraction surface has projections and depressions on the surface thereof for refracting light; and the light refraction surface of the first light diffusion sheet faces the light refraction surface of the second light diffusion sheet to each other.

A light refraction surface of the first light diffusion sheet faces a light refraction surface of the second light diffusion sheet to each other. Therefore, when projections and depressions on the light refraction surface of the first light diffusion sheet come into contact with projections and depressions on the light refraction surface of the second light diffusion sheet, the projections and depressions form gaps each of which has the different distance between the first light diffusion sheet and the second light diffusion sheet from one another at each of their positions. The formation of the gaps makes it possible to separate the first light diffusion sheet from the second light diffusion sheet. Thanks to the gaps, the light can be repeatedly refracted and reflected, and thus the light emitted from the light source can be further diffused. In this manner, the projections and depressions make it possible to form the gaps having the distance different from one another, and thus the image of the light source can become blurred in a wider area.

Furthermore, in the reel belt according to present embodiment, the base sheet and the second light diffusion sheet have both ends (such as ends 258a and 258b, and ends 269a and 269b described below) formed along the longitudinal direction; and a hollow is formed by joining both the ends of the base sheet and both the ends of the second light diffusion sheet opposite to each other (such as an end 258a and an end 269a, and an end 258b and an end 269b opposite to each other described below), the base sheet and the second light diffusion sheet stacked to each other.

Both the ends of the second light diffusion sheet are joined indirectly or directly to both the ends of the base sheet. More specifically, the second light diffusion sheet may be joined directly to the base sheet, or the second light diffusion sheet may be joined to the first light diffusion sheet to be joined together to the base sheet. In such a manner, the second light diffusion sheet is joined indirectly to the base sheet via the first light diffusion sheet.

In this manner, it is thus possible to maintain the first light diffusion sheet, the second light diffusion sheet and the base sheet in a state of being stacked to one another while ensuring the formation of the gaps having the distance different from one another at each of their positions between the first light diffusion sheet and the second light diffusion sheet. For example, the image of a light source can become blurred in a wider area even if the light source having light emission intensity is arranged behind the reel belt.

Furthermore, in the reel belt according to the present embodiment, both the ends (such as ends 268a and 268b described below) of the first light diffusion sheet have a first width (such as W1 described below) along the direction perpendicular to the longitudinal direction;

both the ends (such as ends 269a and 269b described below) of the second light diffusion sheet include two ends (such as ends 269a and 269b described below) formed in the longitudinal direction to be opposite to each other having a distance therebetween, and have a second width (such as W2 described below) along the direction perpendicular to the longitudinal direction, the second width wider than the first width; and the first light diffusion sheet is arranged between both the ends (such as between ends 269a and 268b described below) of the second light diffusion sheet.

The first light diffusion sheet has a first width, and the second light diffusion sheet has a second width wider than the first width. Therefore, the first light diffusion sheet can be arranged in the areas between two ends of the second light diffusion sheet. Such an arrangement makes it possible to form the state where the first light diffusion sheet is not joined to the second light diffusion sheet in the area between the two ends. Therefore, it is possible to prevent the first light diffusion sheet from being brought into closed contact with the second light diffusion sheet, and to form the gaps having the distance different from one another at each of their positions between the first light diffusion sheet and the second light diffusion sheet. The image of the light source thus can become further blurred.

Furthermore, the reel belt according to the present embodiment further includes a light refraction sheet (such as a light refraction sheet 270 described below) with translucency having another light refraction surface (such as a first surface 272 described below) for refracting light passing therethrough so as to be different from the light refraction surface, the light refraction sheet stacked on a symbol forming area on the base sheet including a symbol formed thereon.

A light refraction sheet is stacked on a symbol forming area, and thus the symbol forming area can be illuminated so as to be different from other areas than the symbol forming area. It is thus possible to give an accent to a symbol.

Furthermore, in the reel belt according to the present embodiment, another light refraction surface (a second light refraction surface) has projections and depressions thereon different from those on the light refraction surface (one light refraction surface or a first light refraction surface).

Other light refraction surface has projections and depressions on the surface thereof which are different from those on the light refraction surface, and thus the symbol forming area can be illuminated so as to be different from other areas than the symbol forming area.

Furthermore, a gaming machine (a gaming machine 10 described below) comprising a reel assembly (such as a reel unit 202 described below) having a plurality of rotatable reels (such as reels 220a, 220b, 220c, 220d and 220e described below) and a backlight (such as a backlight device 300 described below) illuminating the plurality of reels from the inside, wherein:

each of the plurality of reels has a reel belt (such as three types of reel belts 222X, 222Y and 222X described below), including:

a first light diffusion sheet (such as a light diffusion sheet 260a described below) with translucency having a light refraction surface (such as a first surface 262 described below) (one light refraction surface or a first light refraction surface) including a surface formed thereon for refracting light emitted from the backlight in various directions, the first light diffusion sheet stacked on a base sheet (such as a symbol displaying sheet 250 described below); and a second light diffusion sheet (such as a light diffusion sheet 260b described below) having a light refraction surface (one light refraction surface or a first light refraction surface), the second light diffusion sheet stacked on the first light diffusion sheet.

It is possible to diffuse light emitted from the backlight in various directions by the first light diffusion sheet, and then to diffuse the diffused light further in various directions by the second light diffusion sheet. Therefore, the image of the light source thus can become blurred in a wide area, and the image of the light source can be prevented from being formed on the reel.

Furthermore, in the gaming machine according to the present embodiment, the base sheet and the second light diffusion sheet have both ends (such as ends 258a and 258b, and ends 269a and 269b described below) formed along the longitudinal direction;

a hollow is formed by joining both the ends of the base sheet and both the ends of the second light diffusion sheet opposite to each other (such as ends 258a and 258b, and ends 269a and 269b described below), the base sheet and the second light diffusion sheet stacked to each other; and the backlight is arranged between the both the ends (such as between ends 258a and 258b, or between ends 269a and 269b described below).

Both the ends of the second light diffusion sheet are made to be indirectly or directly joined to both the ends of the base sheet. More specifically, the second light diffusion sheet may be joined directly to the base sheet, or the second light diffusion sheet may be joined to the first light diffusion sheet to be joined together to the base sheet. In such a manner, the second light diffusion sheet is joined indirectly to the base sheet via the first light diffusion sheet.

In this manner, it is possible to keep the first light diffusion sheet, the second light diffusion sheet and the base sheet in a state of being stacked to one another while ensuring the formation of the gaps having the distance different from one another at each of their positions between the first light diffusion sheet and the second light diffusion sheet. For example, the image of a light source can become blurred even if the light source having light emission intensity is arranged behind the reel belt.

Furthermore, since the backlight is arranged between two ends of the second light diffusion sheet, the image of the backlight is not formed at the two ends even if the first light diffusion sheet comes into close contact with the second light diffusion sheet at the two ends thereof. Therefore, visibility of the reel belt is not decreased.

Furthermore, in the gaming machine according to the present embodiment, the base sheet and the second light diffusion sheet are joined by an adhesive (such as an adhesive 294 described below and the like).

An adhesive can be introduced into the projections and depressions for refracting light, and thus the base sheet and the second light diffusion sheet can be adequately joined to each other. In particular, it is preferable to apply the adhesive on both surfaces of a spacer (such as a spacer 292 described below and the like) having a predetermined thickness to join the base sheet and the second light diffusion sheet. The space is used to form the interval between the base sheet and the second light diffusion sheet, and thus it is possible to prevent the first diffusion sheet from being pressed.

Furthermore, in the gaming machine according to the present embodiment, the second light diffusion sheet (such as a light diffusion sheet 260b described below) has a light refraction surface (such as a first surface 262 described below) same as the light refraction surface (such as a first surface 262 described below) of the first light diffusion sheet (such as a light diffusion sheet 260a described below).

Here, having a light refraction surface same as the light refraction surface of the first light diffusion sheet refers to that the light refraction surface of the second light diffusion sheet refracts light passing therethrough in a similar manner as the light refraction surface of the first light diffusion sheet. In other words, it refers to that the aspect of the refraction of light by the light refraction surface of the second light diffusion sheet is same as the aspect of the refraction of light by the light refraction surface by the first light diffusion sheet. The aspect of the refraction refers to the aspect which can be visibly recognized by a player, including change in direction and angle of light, change in amount of light, change in degree of light to be collected. The sheet manufactured by the similar process has the same light refraction surface.

The first light diffusion sheet and the second light diffusion sheet having the same light refraction surface as each other are used along with each other, so that it is possible to further diffuse the light diffused by the first light diffusion sheet in a similar aspect. Therefore, it is possible to diffuse the light to the area where the light cannot be diffused only by a single light diffusion sheet, and thus the image of the light source can become blurred over a wide area.

Furthermore, in the gaming machine according to the present embodiment, the second light diffusion sheet (such as a light diffusion sheet 270 described below) has a light refraction surface (such as a first surface 272 described below) with translucency, the light refraction surface being different from the light refraction surface (such as a first surface 262 described below) of the first light diffusion sheet (such as a light diffusion sheet 260b described below).

Here, having a light refraction surface different from the light refraction surface of the first light diffusion sheet refers to that the light refraction surface of the second light diffusion sheet refracts light passing therethrough in a different manner from the light refraction surface of the first light diffusion sheet. In other words, it refers to that the aspect of the refraction of light by the light refraction surface of the second light diffusion sheet is different from the aspect of the refraction of light by the light refraction surface by the first light diffusion sheet. The aspect of the refraction herein also refers to the aspect which can be visibly recognized by a player, including change in direction and angle of light, change in amount of light, change in degree of light to be collected. The sheet manufactured by the different process has the different light refraction surface.

The first light diffusion sheet and the second light diffusion sheet having the different light refraction surface from each other are used along with each other, so that it is possible to diffuse light in a different aspect from that of the first light diffusion sheet. More specifically, since the second light diffusion sheet has the light refraction surface different from the light refraction surface of the first light diffusion sheet, the light is diffused in a different aspect from the aspect of diffusing light by the first light diffusion sheet. As described above, the aspect of the refraction includes change in direction and angle of light, change in amount of light, change in degree of light to be collected, etc. Therefore, the first light diffusion sheet and the second light diffusion sheet are stacked with each other, so that it is possible not only to blur the image of the light source, but also to actively form a predetermined diffusion pattern such as a geometric pattern, thereby enhancing the effect by the backlight.

Furthermore, in the gaming machine according to the present embodiment, the second light diffusion sheet (such as a light diffusion sheet 270 described below) is stacked on the symbol forming area (such as a symbol forming area 252 described below and the like) on the base sheet including a symbol (such as a symbol 511a described below and the like) formed thereon.

The second light diffusion sheet is stacked on the symbol forming area. More specifically, the first light diffusion sheet and the second light diffusion sheet are stacked only in the symbol forming area. As described above, when the first light diffusion sheet and the second light diffusion sheet are used which have the different light refraction surfaces from each other, a predetermined diffusion pattern can be formed. Therefore, it is preferable to light the backlight to form a predetermined diffusion pattern when the symbol (the symbol forming area) on which the second light diffusion sheet is stacked passes in front of the backlight, and to extinguish the backlight to form a predetermined diffusion pattern when the symbol has finished passing in front of the backlight. In this manner, it is possible to form and clear the predetermined pattern in accordance with passage of the symbol.

Furthermore, in the gaming machine according to the present embodiment, light emitted from the backlight is diffused by the first light diffusion sheet and the second light diffusion sheet to form diffused light (such as F3 and F6 described below and the like) with a diffusion pattern, thereby illuminating said reel belt;

rotation of the reel provides a first state where visible recognition of the diffusion pattern is made easier than the visible recognition of the symbol (such as a ring pattern shown in FIG. 20 or 21 described below and the like); and stop of the reel provides a second state where visible recognition of the symbol is made easier than the visible recognition of the diffusion pattern (such as a symbol shown in FIG. 19 or 21 described below and the like).

The diffusion pattern is formed by the light emitted from the backlight. Therefore, the diffusion pattern appears always at a given position irrespective of the rotation operation of the reel. On the other hand, the symbol moves along with the rotation operation of the reel.

As described above, it is preferable to light the backlight when the symbol passes, and to extinguish the backlight when the symbol has finished passing. The symbol is moving while the reel is rotating, so that it is difficult for a player to visibly recognize the symbol even if the backlight is lighted. On the other hand, the diffusion pattern appears always at a given position by lighting the backlight irrespective of the rotation movement of the reel. It thus becomes easier for the player to visibly recognize not the symbol but the diffusion pattern. In this manner, the diffusion pattern resultingly becomes more observable than the symbol when the reel is rotated.

Furthermore, when the reel is stopped, the backlight is lighted to indicate the stopped symbol. Therefore, the diffusion pattern appears even in the state where 1 the reel is stopped as long as there is a symbol (symbol forming area). Therefore, when the reel is stopped, the stopped symbol and the diffusion pattern are stacked with each other. However, since characters and drawing design constituting the symbol are clearly displayed when the symbol is stopped, it becomes easier for the player to visibly recognize not the diffusion pattern but the symbol. In this manner, the symbol resultingly becomes more observable than the diffusion pattern when the reel is stopped.

Yet further, the gaming machine according to the present embodiment is preferably provided with a front light for illuminating the reel from the outside. Since the reel is illuminated from the outside, it is possible to visibly recognize the symbol and the like easily even in the case where the backlight is extinguished.

<<<Overall Structure of Gaming Machine 10>>>

Figure 2:
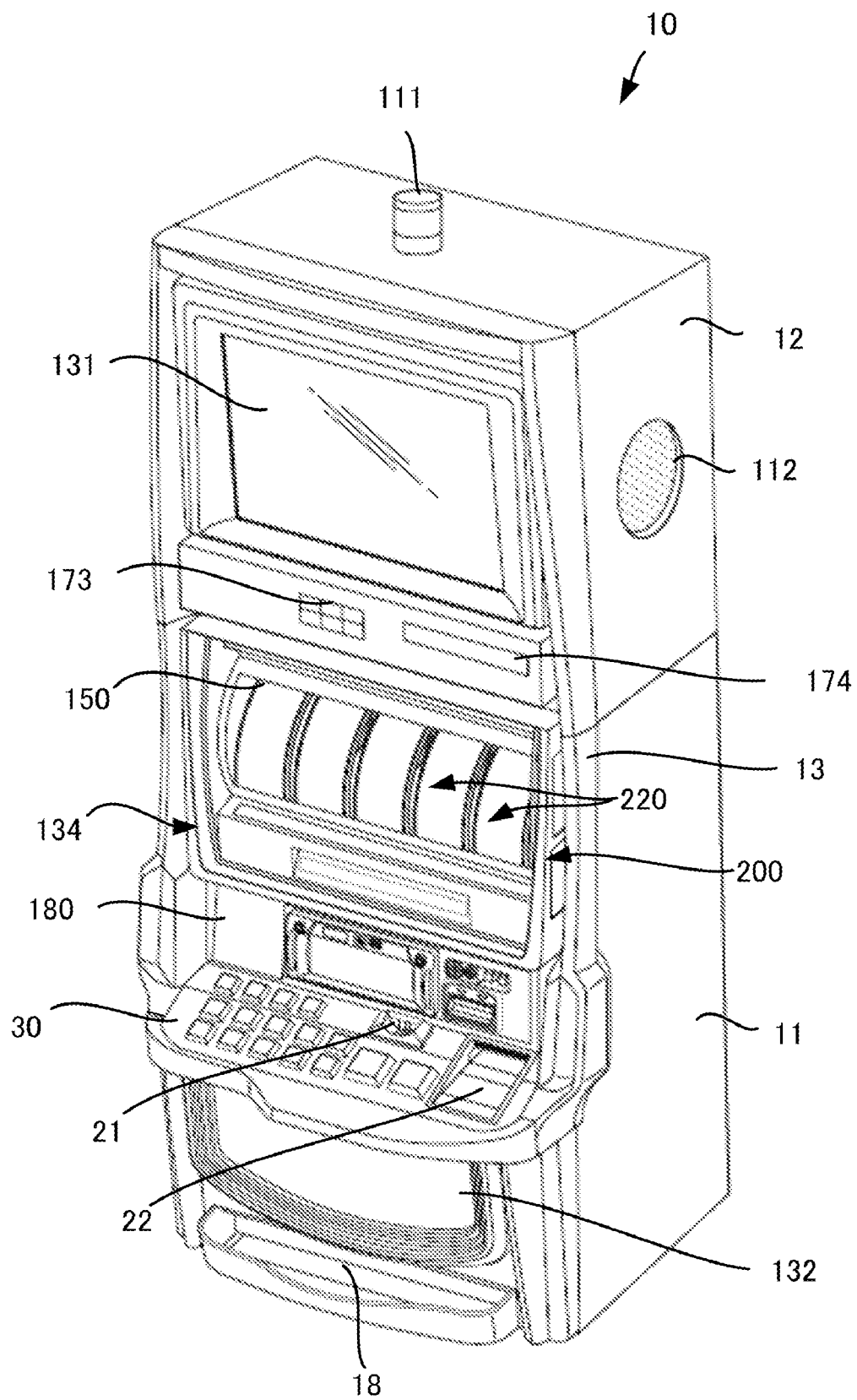
FIG. 2 is a perspective view showing an overall structure of a gaming machine 10 according to an embodiment of the present invention.

FIG. 2 is a perspective view showing an overall structure of the gaming machine 10 according to an embodiment of the present invention.

The gaming machine 10 uses a coin, a bill, or electrical valuable information corresponding thereto as gaming media.

The gaming machine 10 is equipped with a cabinet 11, a top box 12 installed at the top of the cabinet 11, and a main door 13 mounted in front of the cabinet 11.

A reel device M1 is provided on the main door 13. A reel cover 134 is provided on the front of the reel device 200.

As shown in FIG. 2, the reel cover 134 has a display window 150 at the center thereof. The display window 150 makes 15 symbols 501 with five columns and three rows visible from the outside. Three symbols 501 in each column are a part of a group of symbols arranged on the peripheral surface of each of the reels 220a to 220e. Rotation of the five reels 220a to 220e is controlled, so that the symbol 501 arranged on each of the reels 220a to 220e can be moved and displayed upward and downward with changing the speed thereof as a whole. Furthermore, five reels 220a to 220e are controlled to be stopped, so that the symbols 501 can be stopped to rearrange 15 symbols 501 with five columns and three rows in the display window 150.

In addition, although the present embodiment describes the case where the gaming machine 10 is provided with a mechanical-reel type reel device 200, a video reel in which a pseudo reel is displayed may coexist with a mechanical reel in the gaming machine 10 of the present invention. Furthermore, the reel cover 134 may be provided with a touch panel. In this case, a player can operate the touch panel to input a variety of instructions. An input signal is transmitted from the touch panel to a main CPU 71 (not shown). Furthermore, the reel cover 134 may have a transparent liquid crystal panel or a transparent panel.

A control panel 30 is arranged on the lower side of the reel device 200. The control panel 30 is provided with various buttons, a coin entry 21 for receiving a coin into a cabinet 11, and a bill entry 22.

The control panel 30 is provided with a "RESERVE" button, a "COLLECT" button, a "GAME RULES" button, a "1-BET" button, a "2-BET" button, a "3-BET" button, a "5-BET" button, and a "10-BET" button. The "RESERVE" button, the "COLLECT" button, and the "GAME RULES" button are provided on an upper left area of the control panel 30. The "1-BET" button, the "2-BET" button, the "3-BET" button, the "5-BET" button, and the "10-BET" button are provided on a lower left area of the control panel 30. Also, the "START" button is provided on the lower center area of the control panel 30.

The "RESERVE" button is used when a player temporarily leaves his/her seat or when a player wants to ask a staff of the game facility to exchange money, etc. Also, the "RESERVE" button can be used to store credits remaining in an IC card inserted into the IC card reader. The "COLLECT" button is used to instruct the gaming machine 10 to pay out credited coins to a coin tray. The "GAME RULES" button 73 is used when a player is not acquainted with game rules or operation method. When the "GAME RULES" button is pressed, various types of help information are displayed on an upper video display unit 131.

The "BET" button is used to set the betting amount. Each time the "1-BET" button is pressed, one credit among the current credits owned by a player is bet for each of the active pay lines. When the "2-BET" button is pressed, the game starts on condition that two credits are bet for each of the active pay lines. When the "3-BET" button is pressed, the game starts on condition that three credits are bet for each of the active pay lines. When the "5-BET" button is pressed, the game starts on condition that five credits are bet for each of the active pay lines. When the "10-BET" button is pressed, the game starts on condition that ten credits are bet for each of the active pay line. A spin button (START switch) is used to instruct the initiation of spinning the reels 220a to 220e under the betting condition that is set in advance.

As shown in FIG. 2, on a lower front face of the main door 13, i.e., at the lower part of the control panel 30, there are provided a coin receiving opening 18 for receiving a coin, and a belly glass 132 on which a character of the gaming machine 10 is painted.

An upper side image display panel 131 is provided on the front surface of the top box 12. The upper side image display panel 131 is composed of a liquid crystal panel, which constitutes a display. The upper side image display panel 131 displays the image for the effect, and the image showing the introduction of contents of the game and the explanation of rules. Furthermore, the top box 12 is provided with a lamp 111 and a speaker 112. The gaming machine 10 executes the effect by displaying the image, outputting the sound and outputting a ray of light.

A data display unit 174 and a key pad 173 are provided in the lower part of the upper image display unit 131. The data display unit 174 is composed of a luminescent display, an LED, and the like, and is for displaying data relating to a member that is read from the IC card inserted by way of a PTS terminal, and data input by a player via the key pad 173. The key pad 173 is used for inputting data.

<<Reel Device 200>>

Figure 3:
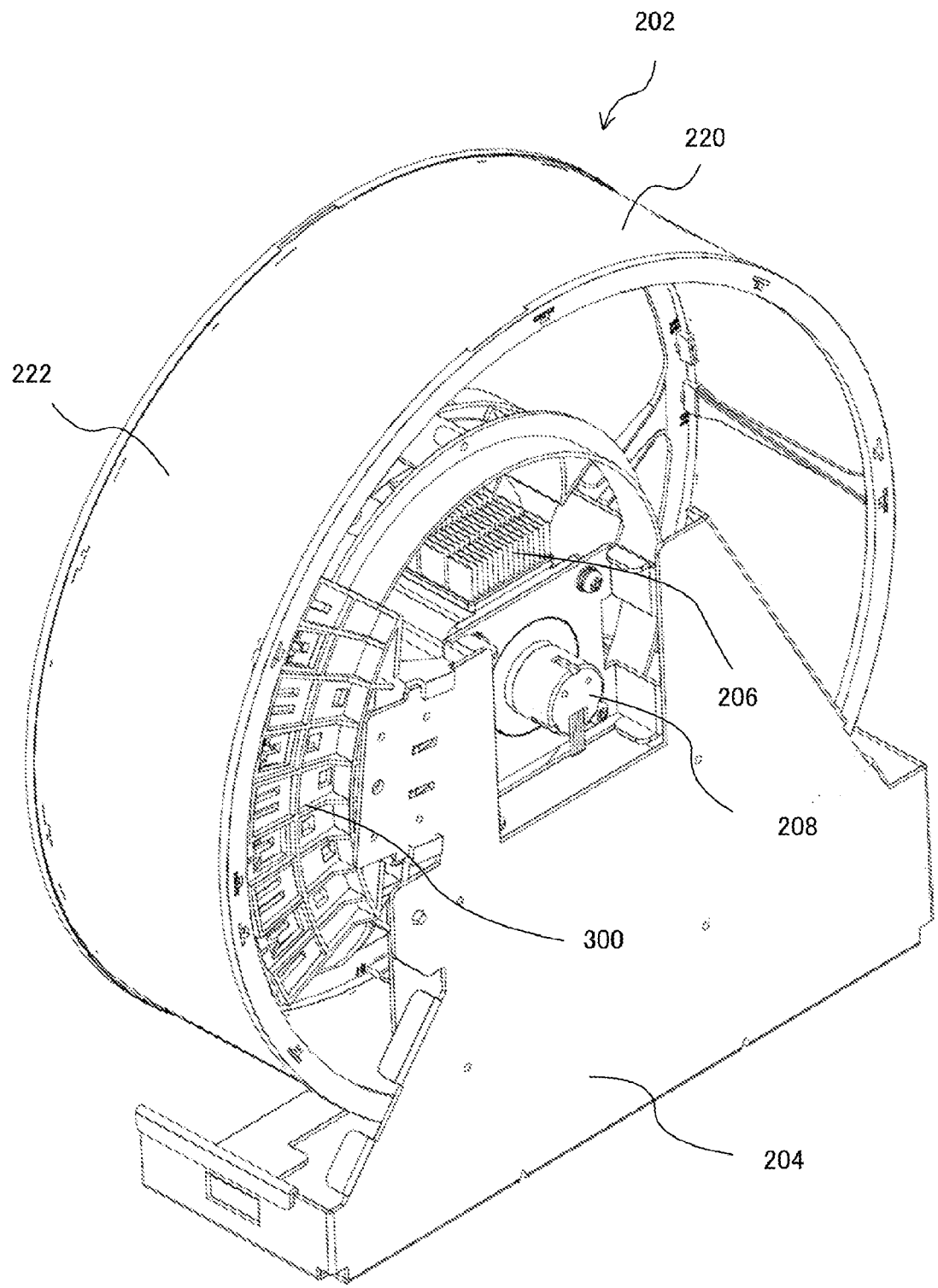
FIG. 3 is a perspective view showing a reel nit 202.

FIG. 3 is a perspective view showing a reel unit 202.

The reel device 200 (refer to FIG. 2) provided in the gaming machine 10 supports the five reels 220a to 220e in the horizontal direction so that the five reels 220a to 220e have collinear rotation axis. The reel device 200 detachably holds five reel units 202a to 202e. Each of the five reels 220a to 220e has a symbol 501 arranged on the outer peripheral surface thereof. In addition, the present embodiment includes six symbols 501a, 501b, 501c, 501d, 501e and 501f.

The reel unit 202a has a reel 220a and a reel supporting mechanism 204a for supporting the reel 220a. The reel unit 202a rotatably drives the reel 220a. The reel 220a has a circular reel belt 222a on which more than one symbols 501 is aligned.

The reel unit 202b has a reel 220b and a reel supporting mechanism 204b for supporting the reel 220b. The reel unit 202b rotatably drives the reel 220b. The reel 220b has a circular reel belt 222b on which more than one symbols 501 is aligned.

The reel unit 202c has a reel 220c and a reel supporting mechanism 204c for supporting the reel 220c. The reel unit 202c rotatably drives the reel 220c. The reel 220c has a circular reel belt 222c on which more than one symbols 501 is aligned.

The reel unit 202d has a reel 220d and a reel supporting mechanism 204d for supporting the reel 220d. The reel unit 202d rotatably drives the reel 220d. The reel 220d has a circular reel belt 222d on which more than one symbols 501 is aligned.

The reel unit 202e has a reel 220e and a reel supporting mechanism 204e for supporting the reel 220e. The reel unit 202d rotatably drives the reel 220e. The reel 220e has a circular reel belt 222e on which more than one symbols 501 is aligned.

Each of the five reel units 202a to 202e rotatably drives the reels 220a to 220e to rearrange the symbols 501. More specifically, 15 symbols 501 with five columns and three rows are arranged in the display window 150, so that the symbols 501 are arranged in the display window 150. This makes it possible to make the symbols 501 rearranged in the display window 150 visible to a player.

In the description below, the five reel units 202a to 202e will be simply referred to as a reel unit 202 if it is not necessary to identify each of them separately. Likewise, the five reels 220a to 220e will be simply referred to as a reel 220 if it is not necessary to identify each of them separately. Furthermore, the five reel belts 222a to 222e will be simply referred to as a reel belt 222 if it is not necessary to identify each of them separately.

Furthermore, the reel unit 202 has a reel driving mechanism 206 which rotatably drives the reel 220 to rearrange the symbol 501, and a reel angle detection mechanism 208 which outputs a position pulse signal at a predetermined angler unit by the rotation of the reel 220 and also outputs an origin pulse signal for each rotation of the reel 220.

<<Reel 220>>

Figure 4:
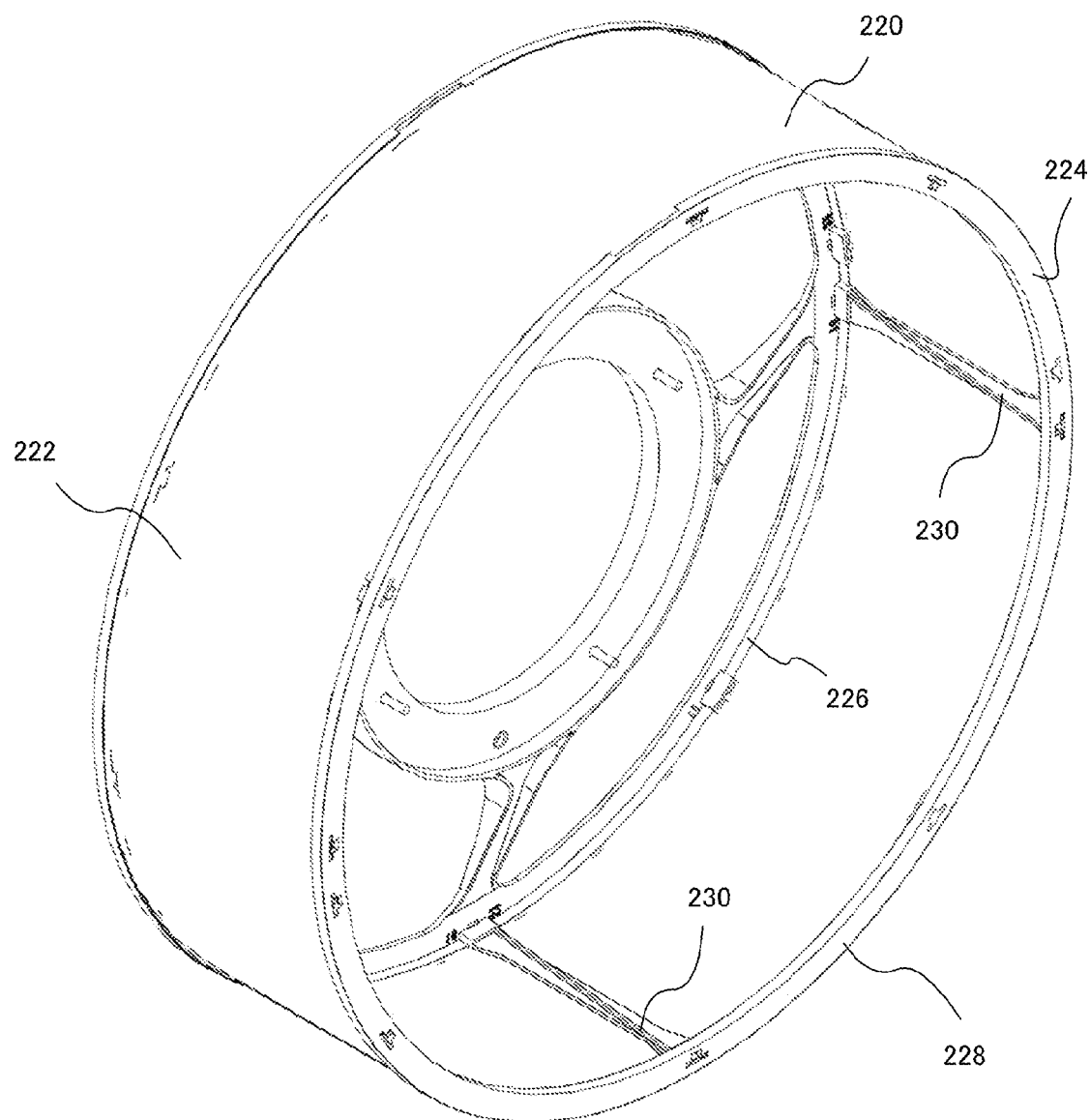
FIG. 4 is a perspective view showing a reel 220.

FIG. 4 is a perspective view showing the reel 220.

The reel 220 has the reel belt 222 and a reel frame body 224. The reel belt 222 has a circular shape. The reel belt 222 includes more than one symbols 501 aligned thereon along a circumferential direction. The reel frame body 224 is provided with a reel belt 222 on the outer peripheral surface thereof.

The reel frame body 224 has a driving-side reel frame body 226 which holds one end side of the reel belt 222, a driven-side reel frame body 228 which holds the other end side of the reel belt 222, and a frame body coupling member 230 which couples the outer peripheral portion of the driving-side reel frame body 226 to that of the driven-side reel frame body 228. The reel frame body 224 formed by those members is made of a material that passes light therethrough.

In the reel 220, it is possible to assemble the reel frame body 224 by coupling the driving-side reel frame body 226 and the driven-side reel frame body 228 by means of the frame body coupling member 230 from the state where the reel frame body 224 is divided into two parts, i.e., the driving-side reel frame body 226 and the driven-side reel frame body 228. Therefore, it is possible to easily change the width of the reel frame body 224, i.e., the width of the reel 220 provided with the reel frame body 224 and the reel belt 222 only by changing the length of the frame body coupling member 230.

On the other hand, the driven-side reel frame body 228 has a reel belt mating portion to which the end side of the reel belt 222 is fit. The reel belt mating portion of the driven-side reel frame body 228 is formed along the whole circumference of the driven-side reel frame body 228. Likewise, the driving-side reel frame body 226 has a reel belt mating portion to which the end side of the reel belt 222 is fit. The reel belt mating portion of the driving-side reel frame body 226 is formed along the whole circumference of the driven-side reel frame body 228.

One end side (left end side) of the reel belt 222 can be sandwiched in the reel belt mating portion of the driving-side reel frame body 226 along the whole circumference of the driving-side reel frame body 226. One end side (right end side) of the reel belt 222 can be sandwiched in the reel belt mating portion of the driving-side reel frame body 226 along the whole circumference of the driving-side reel frame body 226. The driving-side reel frame body 226 and the driven-side reel frame body 228 are coupled to each other by means of the frame body coupling member 230, so that it is possible to assemble the reel 220 with one end side and the other end side of the reel belt 222 sandwiched therein. This makes it possible to easily integrate the reel belt 222 to the reel frame body 224. The reel frame body 224 holds the whole circumference of the reel belt 222, so that it is possible to increase shape retainability at the time of holding the reel belt 222 by the reel frame body 224.

Furthermore, the frame body coupling member 230 is arranged so as to be able to support the underside of the reel belt 222. This makes it possible to further increase shape retainability when held by the reel frame body 224. Moreover, the reel belt 222 is made of a material such as acrylic resin that can pass illuminating light therethrough.

The structure of the reel belt 222 according to the present embodiment will be described further in detail below.

<<Backlight Device 300>>

The backlight device 300 is arranged at the inner peripheral side of the reels 220a to 220e. The backlight device 300 emits illumination light from the inner peripheral side of the reels 220a to 220e. The irradiation light illuminates the symbol on the reel belt 222 from the underside of the reel belt 222. The symbol 501 is visibly recognized by a player from the outside of the gaming machine 10.

Figure 5:
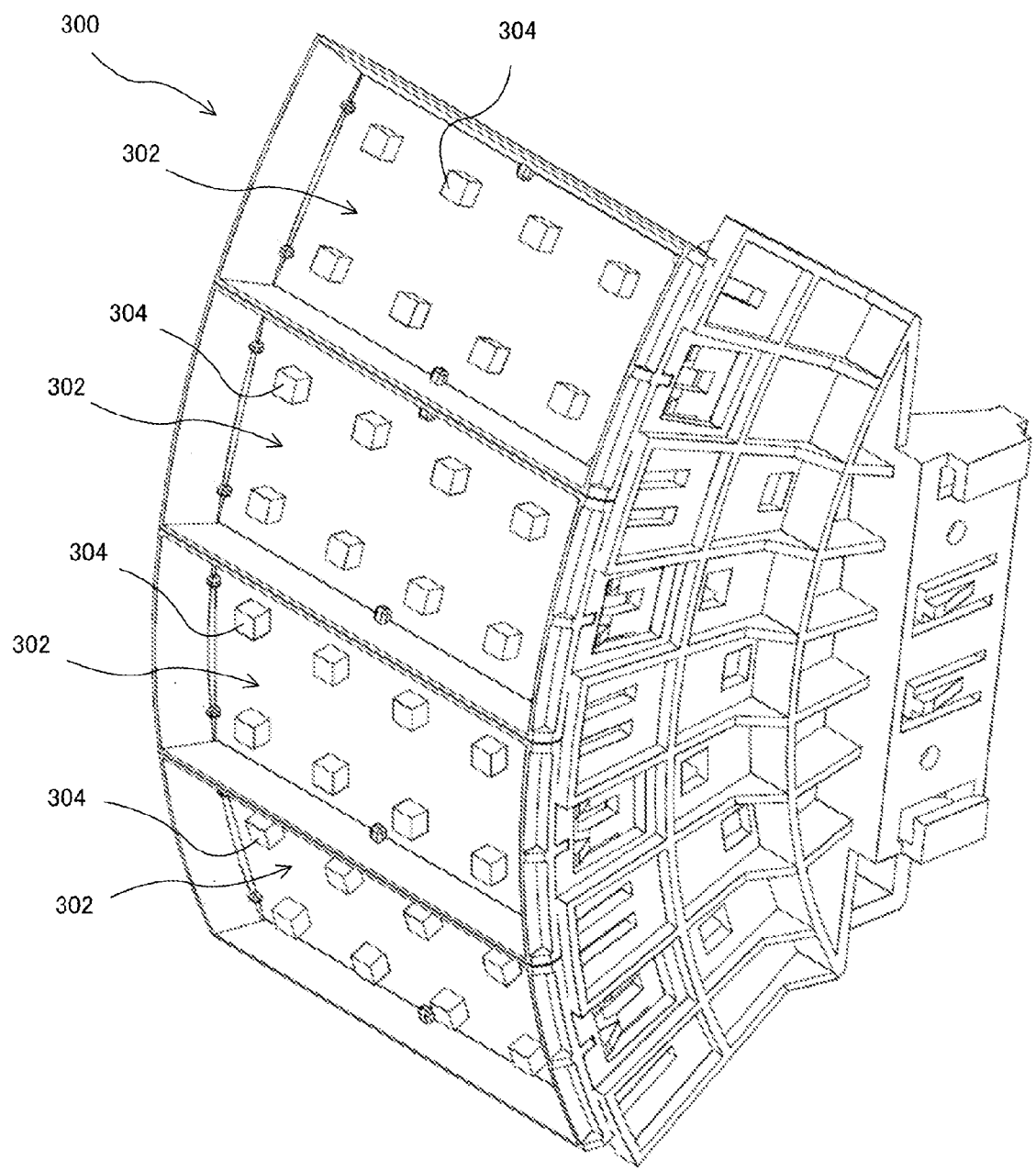
FIG. 5 is a perspective view showing a backlight device 300.

The backlight device 300 is provided for corresponding to each of the reels 220a to 220e. As shown in FIG. 5, the backlight device 300 includes a unit composed of four modules 302 arranged in matrix.

Each of the light source devices 304 is a full-color LED in which a red LED element capable of emitting red light, a blue LED element capable of emitting blue light, and a green LED element capable of emitting green light are packaged. In each of the light source devices 304, the main CPU (not shown) controls the lighting and extinguishing of the red LED element, the blue LED element, and the green LED element, and the individual amount of light at the time of lighting for each LED element. The light source device 304 can emit a visible light with an arbitrary color by adjusting the amount of light of each of the LED elements.

<<Reel Belt 222>>

In the present embodiment, reel belt 222 includes three types of reel belts 222X, 222Y and 222Z. The five reel belts 222a to 222e described above indicate the reel belts attached to each of the reels 220a to 220e of the reel device 200. On the other hand, the reel belts 222X, 222Y and 222Z indicate the types of reel belt each of which has different symbols arranged thereon. Each of the reel belts 222X, 222Y and 222Z corresponds to any of the five reel belts 222a to 222e.

FIG. 6A is a front view showing a surface of the reel belt 222X, FIGS. 6B, 6C-1 and 6C-2 are vertical cross sectional views thereof, and FIG. 6D is a backside view thereof. More specifically, FIG. 6A is a front view showing a surface of the reel belt 222X. FIG. 6B is a vertical cross sectional view along the cross section B-B. FIG. 6C-1 is a vertical cross sectional view along the cross section C1-C1. FIG. 6C-2 is a vertical cross sectional view along the cross section C2-C2. FIG. 6D is a backside view showing a underside.

FIG. 13A is a front view showing a surface of the reel belt 222Y, FIGS. 13B, 13C-1 and 13C-2 are vertical cross sectional views thereof, and FIG. 13D is a backside view thereof. More specifically, FIG. 13A is a front view showing a surface of the reel belt 222Y. FIG. 13B is a vertical cross sectional view along the cross section B-B. FIG. 13C-1 is a vertical cross sectional view along the cross section C1-C1. FIG. 13C-2 is a vertical cross sectional view along the cross section C2-C2. FIG. 13D is a backside view showing a underside.

FIG. 14A is a front view showing a surface of the reel belt 222Z, FIGS. 14B, 14C-1 and 14C-2 are vertical cross sectional views thereof, and FIG. 14D is a backside view thereof. More specifically, FIG. 14A is a front view showing a surface of the reel belt 222Z. FIG. 14B is a vertical cross sectional view along the cross section B-B. FIG. 14C-1 is a vertical cross sectional view along the cross section C1-C1. FIG. 14C-2 is a vertical cross sectional view along the cross section C2-C2. FIG. 14D is a backside view showing a underside.

As described below, while three types of reel belts 222X, 222Y and 222Z have the symbols 501 differently located from one another, the basic structures of them are same. Three types of reel belts 222X, 222Y and 222Z will be simply referred to as a reel belt 222 below if it is not necessary to particularly identify each of them.

<<<Symbol 501>>>

A plurality of types of symbols is printed on each of the three types of reel belts 222X, 222Y and 222Z.

As shown in FIG. 6A, the reel belt 222X has five symbols 501a, 501b, 501c, 501d and 501e printed thereon. The symbol 501a is a symbol having a rectangular contour on which a young male is printed. The symbol 501a is a symbol having a contour of number seven on which a young female is printed. The symbol 501c is a symbol showing a word of "BAR". The symbol 501d is a symbol showing two words of "BAR". The symbol 501e is a symbol showing three words of "BAR".

As shown in FIG. 13A, the reel belt 222Y has five symbols 501a, 501b, 501c, 501d and 501e printed thereon. As shown in FIG. 14A, the reel belt 222Z has six symbols 501a, 501b, 501c, 501d, 501e and 501f printed thereon. The symbol 501f is a symbol showing a picture of a bird spreading its wings, and characters "CHANCE".

The symbols 501a to 501f will be simply referred to as a symbol 501 below if it is not necessary to identify each of them separately. In addition, in the present embodiment, the symbol 501 includes a blank symbol as described below.

<<Structure of Reel Belt 222>>

The reel belt 222 has a face sheet 250, a light diffusion sheet 260a, a light diffusion sheet 260b, a light refraction sheet 270 and a protection sheet 280.

<Face Sheet 250>

The face sheet 250 is a transparent and flexible sheet having a shape of elongated strip. For example, the face sheet 250 is preferably made of a PET (polyethylene terephthalate) film.

As described below, the symbol 501, patterns and the like are printed on the underside surface of the face sheet 250. The area in which the symbol 501 is printed forms a symbol forming area 252. For example, the symbol 501, patterns and the like can be printed on the underside surface of the face sheet 250 by UV inkjet printing system.

The symbol forming area 252 is the area in which the symbols 501a and 501b shown in FIGS. 6A, 13A and 14A are formed.

Furthermore, the portion in which the symbol 501 and patterns are not printed is maintained to be transparent. The area in which the symbol 501 is not printed forms a no-symbol forming area 254, as shown in FIGS. 6A, 13A and 14A.

Figure 7A:
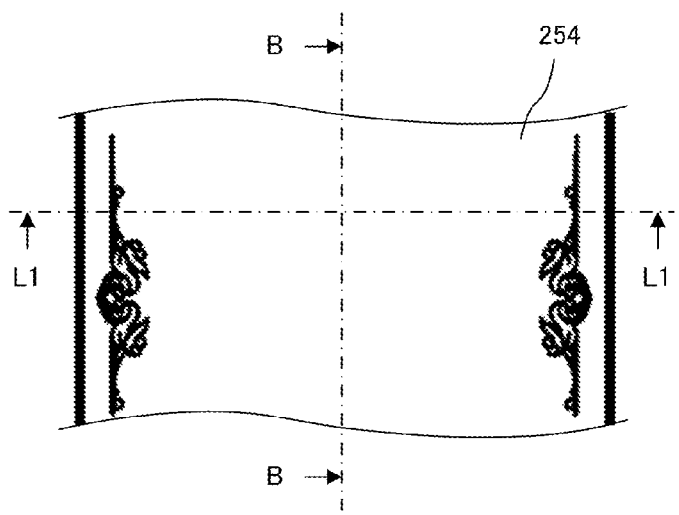
FIGS. 7A, 7B and 7C are diagrams showing a no-symbol forming area 254 in which no symbol is formed.
Figure 7C:
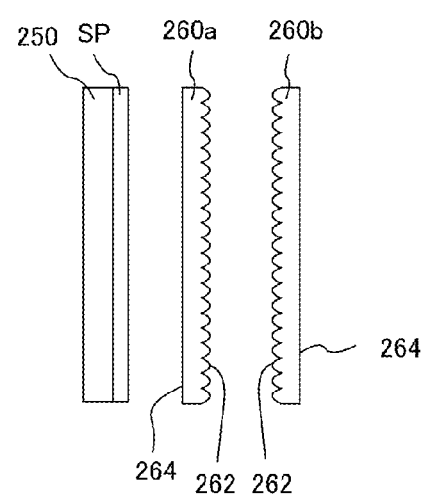
Figure 7B:
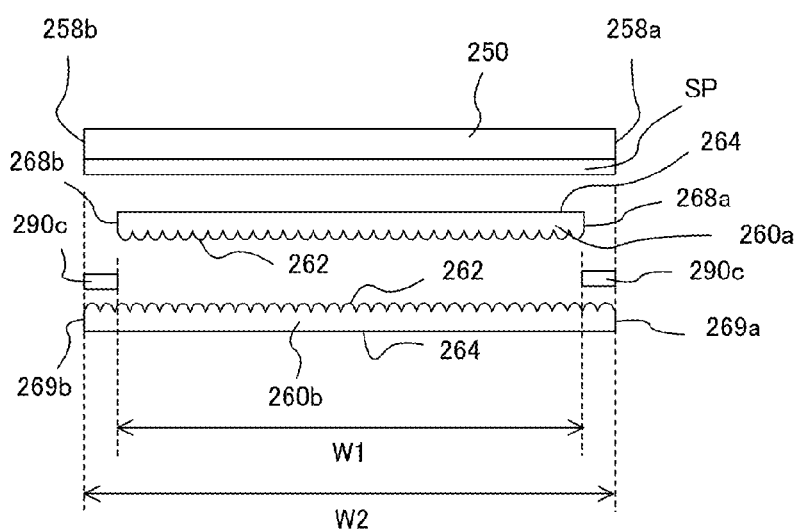

Furthermore, as shown in FIG. 7B, the face sheet 250 has both a first end 258a and a second end 258b. The two ends 258a and 258b are formed along the longitudinal direction of the face sheet 250. The two ends 258a and 258b are formed to be opposite to each other having a distance therebetween. Furthermore, the face sheet 250 has a width W2 along the direction perpendicular to the longitudinal direction. More specifically, the width W2 is a length ranging from the first end 258a to the end 258b along the direction perpendicular to the longitudinal direction of the face sheet 250.

In addition, in the present embodiment, both the first end 258a and the second end 258b include an area corresponding to a width of a double-faced tape 290c for use in affixation to the light diffusion sheet 260b by means of the double-faced tape 290c described below.

<Light Diffusion Sheet 260a and Light Diffusion Sheet 260b>

The light diffusion sheet 260a and the light diffusion sheet 260b have the same structure as each other. It will be simply referred to as a light diffusion sheet 260 below if it is not necessary to particularly identify each of them. The light diffusion sheet 260 is a translucent and flexible sheet having a shape of elongated strip. The light diffusion sheet 260 is milky white, for example, which is opaque white but translucent. The light diffusion sheet 260 has two surfaces of a first surface 262 and a second surface 264.

The light diffusion sheet 260 is preferably made of flexible PVC (plasticized polyvinyl chloride) film. An effect sheet (SPARKLE plasticized polyvinyl chloride available from Three Like Co., Ltd.) and the like can be used as the light diffusion sheet 260, for example.

A plurality of tiny projections and depressions having a predetermined shape is formed on the first surface 262. The projections and depressions are composed of a plurality of convex portions and a plurality of concave portions. The plurality of convex portions and the plurality of concave portions are formed randomly. It is possible to refract and scatter light entered into the first surface 262 of the light diffusion sheet 260 in every directions by randomly forming the plurality of convex portions and the plurality of concave portions. More specifically, it is possible to diffuse light entered into the first surface 262 by the plurality of convex portions and the plurality of concave portions formed randomly.

The convex portions and the concave portions may be formed by a curved surface, or may be formed by a combination of flat surfaces. The convex portions act as tiny convex lens. Furthermore, the concave portions act as tiny concave lens. The convex portions and the concave portions just have to act as lenses of this kind to diffuse light entered into the first surface 262.

Specifically, the projections and depressions formed on the first surface 262 reflect a part of light entered into the first surface 262, and the residual light is refracted. Both the light reflected and the light refracted by the projections and depressions spread with distance from the light diffusion sheet 260. In this manner, the light entered into the light diffusion sheet 260 is diffused by the projections and depressions.

Parameters indicating the projections and depressions include arithmetic mean roughness (Ra) of projections and depressions. The projections and depressions on the light diffusion sheet 260 can be formed so that the arithmetic mean roughness (Ra) is included within a predetermined range taking wavelength of light to be used into consideration. The arithmetic mean roughness (Ra) can determine the degree of diffusion of light entered into the light diffusion sheet 260. Increase in the arithmetic mean roughness (Ra) makes it possible to roughen the projections and depressions, so that it is possible to increase the degree of light diffusion. Decrease in the arithmetic mean roughness (Ra) makes it possible to smoothen the projections and depressions, so that it is possible to decrease the degree of light diffusion.

In addition, as a parameter indicating the surface roughness of projections and depressions, it is possible to use ten point mean roughness (Rz), maximum height (Rmax), etc. in addition to the arithmetic mean roughness (Ra). Other roughness parameters also can be used. Any kind of parameter can be used as the degree of diffusion of entered light by projections and depressions.

No projection and depression are formed on the second surface 264. The second surface 264 is finished to be smoother than the first surface 262 when comparing them to each other.

The projections and depressions on the first surface 262 can be formed as follows. For example, it is possible to form tiny projections and depressions on the light diffusion sheet 260 by fine particles impinging on the light diffusion sheet 260 (sandblasting). Furthermore, it is possible to form projections and depressions on the light diffusion sheet 260 by pressing the light diffusion sheet 260 against a metal mold on which projections and depressions are previously formed so as to transfer the projections and depression on the metal mold to the light diffusion sheet 260 (embossing). Furthermore, it is possible to form projections and depressions by attaching translucent fine particles to the light diffusion sheet 260. In addition thereto, it is possible to form projections and depressions by applying energy beam such as a laser on the light diffusion sheet 260.

As shown in FIG. 7B, the light diffusion sheet 260a has both a first end 268a and a second end 268b. The two ends 268a and 268b are formed along the longitudinal direction of the light diffusion sheet 260a. The two ends 268a and 268b are formed to be opposite to each other having a distance therebetween. Furthermore, the light diffusion sheet 260a has a width W1 along the direction perpendicular to the longitudinal direction. More specifically, the width W1 is a length ranging from the first end 268a to the end 268b along the direction perpendicular to the longitudinal direction of the light diffusion sheet 260a. The width W1 is shorter than the width W2 of the face sheet 250.

Furthermore, as shown in FIG. 7B, the light diffusion sheet 260b has both a first end 269a and a second end 269b. The two ends 269a and 269b are formed along the longitudinal direction of the light diffusion sheet 260b. The two ends 269a and 269b are formed to be opposite to each other having a distance therebetween. Furthermore, the light diffusion sheet 260b has a width W2 along the direction perpendicular to the longitudinal direction. More specifically, the width W2 is a length ranging from the first end 269a to the end 269b along the direction perpendicular to the longitudinal direction of the light diffusion sheet 260b. The width W2 is shorter than the width W1 of the light diffusion sheet 260a.

As described above, the face sheet 250 and the light diffusion sheet 260b have the same width W2 as each other, and the light diffusion sheet 260a has the width W1 which is shorter than the width W2.

In addition, in the present embodiment, both the first end 269a and the second send 269b of the light diffusion sheet 260b include an area corresponding to the width of the double-faced tape 290c for affixation to the face sheet 250 by the double-faced tape 290c described below.

<Light Refraction Sheet 270>

The light refraction sheet 270 is a transparent and flexible sheet having a shape of elongated strip. The light refraction sheet 270 is opaque white but translucent. The light refraction sheet 270 has two surfaces, i.e., a first surface 272 and a second surface 278. For example, the light refraction sheet 270 is preferably made of flexible PVC (plasticized polyvinyl chloride) film. An effect sheet (BRICK CUBE plasticized polyvinyl chloride available from Three Like Co., Ltd.) and the like can be used as the light refraction sheet 270, for example.

Figure 12A:
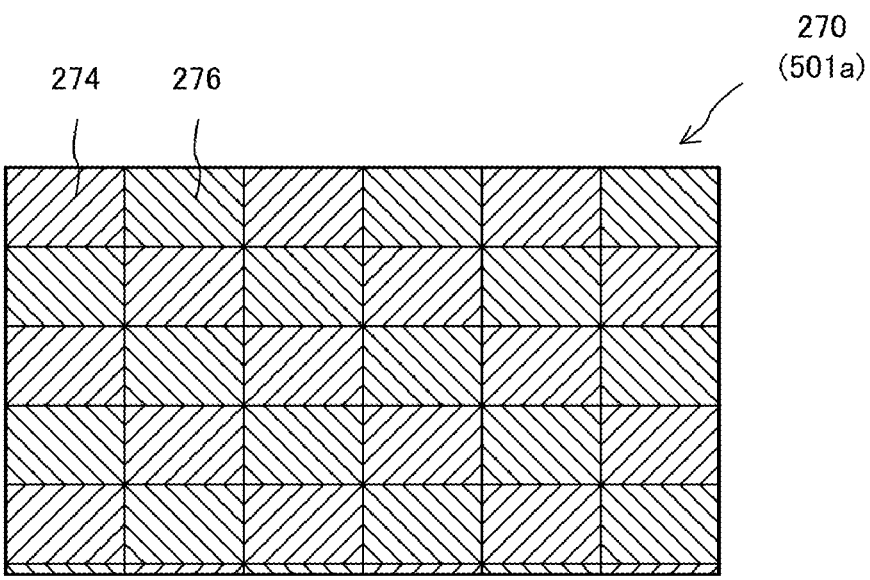
FIG. 12A is a front view showing a first surface 272 of a symbol forming area 252 in which a symbol 501a is formed.
Figure 12B:
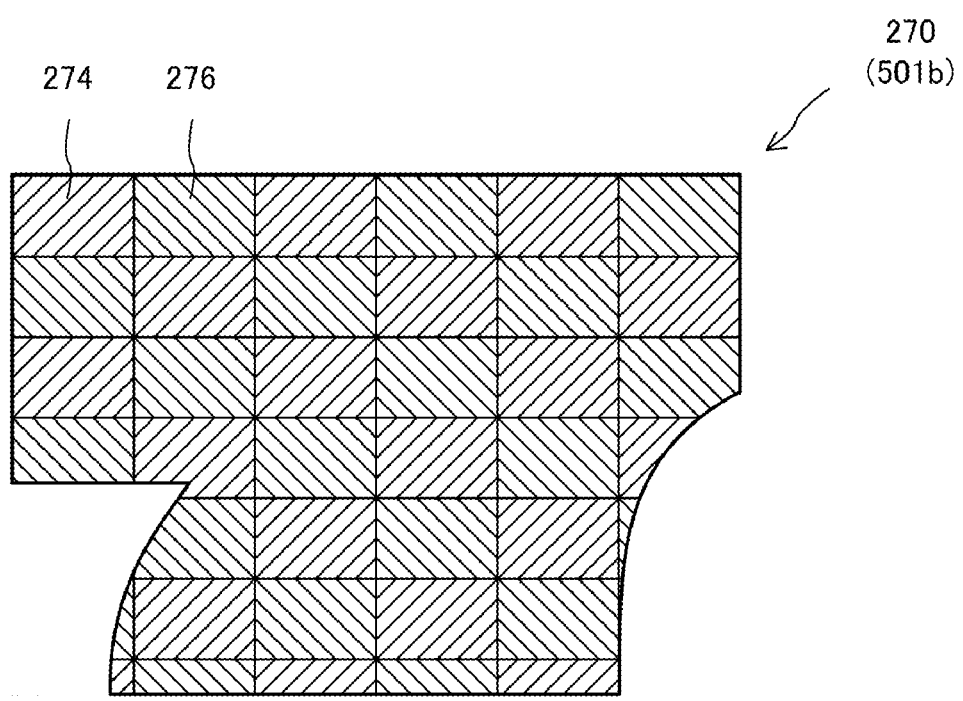
FIG. 12B is a front view showing a first surface 272 of a symbol forming area 252 in which a symbol 501b is formed.

Tiny projections and depressions having a predetermined shape are formed on the first surface 272. As shown in FIGS. 12A and 12B, the first surface 272 has a plurality of first small areas 274 and a plurality of second small areas 276 formed thereon which are arranged in a staggered configuration. FIG. 12A is a front view showing the first surface 272 in the symbol forming area 252 on which the symbol 501a is formed. FIG. 12B is a front view showing the first surface 272 in the symbol forming area 252 on which the symbol 501b is formed. In addition, in FIGS. 12A and 12B, the first small area 274 is indicated by applying lines rising diagonally up and to the right, and the second small area 276 is indicated by applying lines declining diagonally down and to the right.

Convex and concave shapes are formed in a regular pattern on the first small area 274 and the second small area 276 by a plurality of elongated projections, grooves or ridges. For example, it is possible to take the shape in which convex portions are formed in a grid-like pattern, or to take the shape in which concave portions are formed in a grid-like pattern. Each of the grids can take the shape of square or rectangle, as well as rhombus or parallelogram. The projections and depressions are formed in a grid-like shape, so that a plurality of elongated tiny convex and concave portions is aligned in a regular pattern in the first small area 274 and the second small area 276. In addition, the projections and depressions in the first small area 274 and the second small area 276 are not only in a grid-like pattern, but just have to be in a shape with regularity.

Each of the convex and concave portions constituting the projections and depressions acts as a lens such as a cylindrical lens, or acts as a prism. In this manner, the projections and depressions can act as a plurality of elongated tiny lenses or a plurality of elongated tiny prisms aligned in a regular pattern by forming them in a regular pattern. Therefore, lenses or prisms aligned in a regular pattern can reflect and refract the light entered into the first small area 274 and the second small area 276 in a predetermined direction based on the projections and depressions.

The projections and depressions formed in the first small area 274 are different from the projections and depressions formed in the second small area 276. In this manner, the light entered into the first small area 274 can travel in the different direction from the direction in which the light entered into the second small area 276 travels. This makes it possible to enhance a presentation effect by the light emitted from the backlight device 300. The light refraction sheet 270 is laid on the symbol forming region 252 in which the symbol 501a is printed, or on the symbol forming region 252 in which the symbol 501b is printed. Therefore, it is possible to enhance a presentation effect by the light that illuminates the symbol 501a and the symbol 501b.

Parameters indicating the projections and depressions include an interval, height (depth), length in the longitudinal direction and the like of the convex portions or the concave portions. The interval between the convex portions or the concave portions can be an average interval between two convex portions adjacent to each other, or an average interval between two concave portions adjacent to each other. Furthermore, the interval between the convex portions or the concave portions or the height thereof can be an average height from a valley of a concave portion to the vertex of a convex portion adjacent to each other. Such a length is defined as appropriate, so that the degree of reflection or refraction can be determined. Furthermore, parameters indicating the projections and depressions also include an orientation of the longitudinal direction of the convex portions or the concave portions. The direction of reflection and refraction can be defined depending on the orientation of the longitudinal direction. These parameters can be defined taking the wavelength of light to be used into consideration.

No projection and depression are formed on the second surface 278. The second surface 278 is finished to be smoother than the first surface 272 when comparing them to each other.

With regard to the projections and depressions in the first small area 274 and the second small area 276, it is also possible to employ sandblasting and embossing described above, as well as attachment of translucent fine particles to the light diffusion sheet 260, in order to form the projections and depressions. In addition thereto, projections and depressions may be formed by applying energy beam such as a laser on the light refraction sheet 270. It just has to be formed the projections and depression in any case.

The example described above has shown the case where the projections and depressions in the first small area 274 and the second small area 276 are formed in a grid-like pattern. However, the projections and depressions in the first small area 274 and the second small area 276 are not limited to be formed in a grid-like pattern, but the configuration just has to be with regularity. It is just has to reflect and refract the light entered into the first small area 274 and the second small area 276 in the predetermined direction based on the projections and depressions formed in a regular pattern.

Figure 9A:
FIGS. 9A, 9B and 9C are diagrams showing a symbol forming area 252 in which a symbol 501a is formed.
Figure 9C:
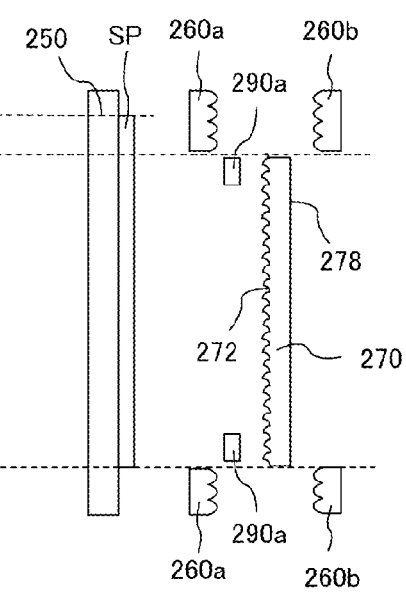
Figure 9B:
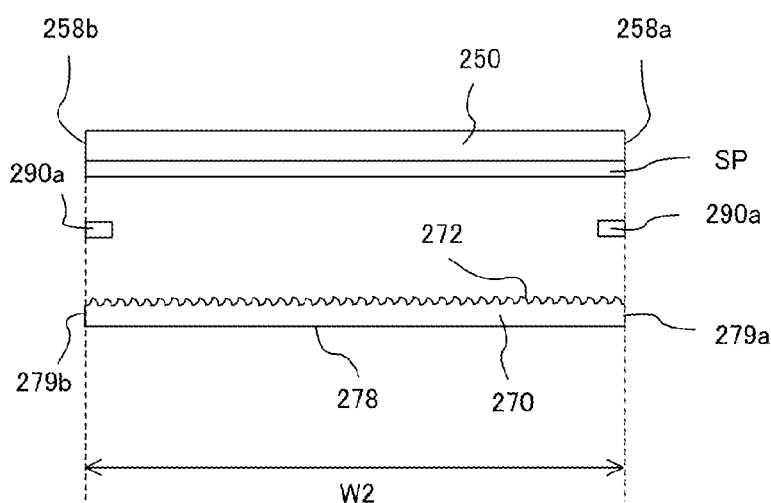

Furthermore, as shown in FIG. 9B, the light refraction sheet 270 has both a first end 279a and a second end 279b. The two ends 279a and 279b are formed along the longitudinal direction of the light refraction sheet 270. The two ends 279a and 279b are formed to be opposite to each other having a distance therebetween. Furthermore, the light refraction sheet 270 has a width W2 along the direction perpendicular to the longitudinal direction. More specifically, the width W2 is a length ranging from the first end 279a to the end 279b along the direction perpendicular to the longitudinal direction of the light refraction sheet 270.

Figure 10A:
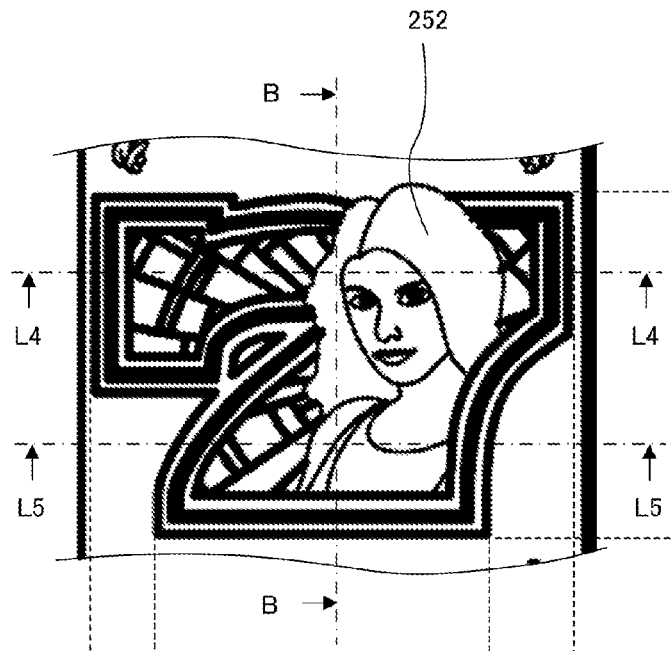
Figure 10C:
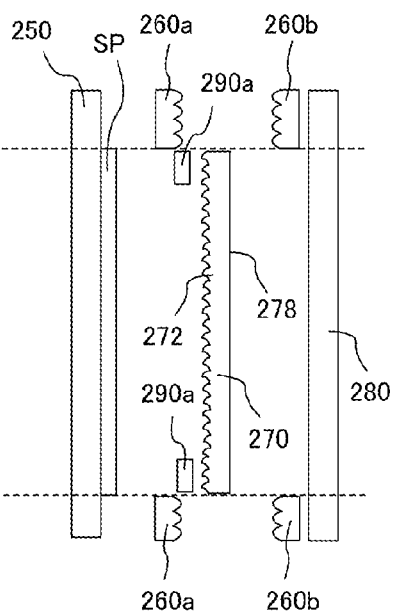
Figures 1, 10B:
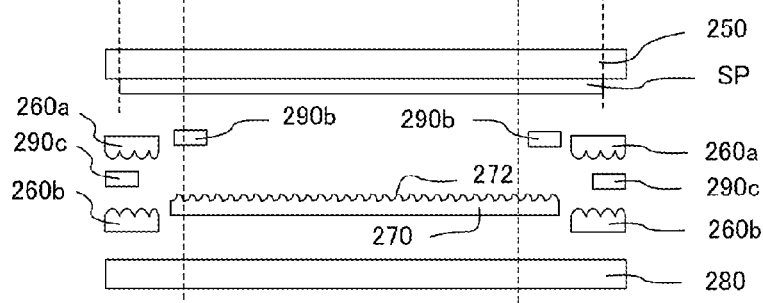
Figures 2, 10B:
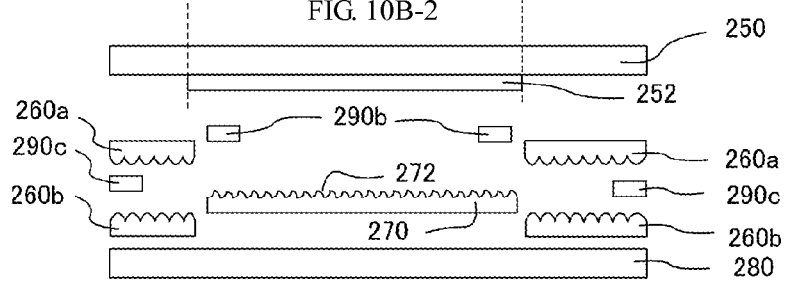

In addition, the light refraction sheet 270 shown in FIGS. 10B-1, 10B-2 and 10C has the shape of a number "7". Therefore, as shown in FIG. 10B, the light refraction sheet 270 has the width varying in accordance with the shape of a number "7".

In addition, in the present embodiment, both the first end 279a and the second end 279b of the light refraction sheet 270 include an area corresponding to widths of a double-faced tape 290a and a double-faced tape 290b for use in affixation to the face sheet 250 by means of the double-faced tape 290a and the double-faced tape 290b described below.

<Protection Sheet 280>

The protection sheet 280 is a transparent and flexible sheet. For example, the face sheet 250 is preferably made of PVC (plasticized polyvinyl chloride) film. The protection sheet 280 is a sheet for protecting the light refraction sheets 270, 350 and 360 described above. PVCTB80 NPL11LLY manufactured by Lintec and the like can be used as the protection sheet 280, for example.

An adhesive (not shown) is applied on one surface of the protection sheet 280 to make it possible to protect the light refraction sheet 270 by being affixed on the light refraction sheet 270.

<Double-Faced Tapes 290a, 290b, 290c, 290d and 290e>

The double-faced tape 290a is for affixing the light refraction sheet 270 to the area on the face sheet 250 in which the symbol 501a is printed. In FIG. 6C-1, the double-faced tape 290a is shown by a thick solid line. As shown in FIG. 6C-1, the double-face tape 290a has the shape of winding along the periphery of the symbol 501a. The double-faced tape 290a can affix only the periphery of the light refraction sheet 270 to the face sheet 250.

The double-faced tape 290b is for affixing the light refraction sheet 270 to the area in which the symbol 501b is printed. In FIG. 6C-1, the double-faced tape 290b is shown by a thick solid line. As shown in FIG. 6C-1, the double-face tape 290b has the shape of winding along the periphery of the symbol 501b. The double-faced tape 290b can affix only the periphery of the light refraction sheet 270 to the face sheet 250.

The double-faced tape 290c is for affixing the light diffusion sheet 260b to the underside surface of the face sheet 250. In FIG. 6C-2, the double-faced tape 290c is shown by a thick solid line. As shown in FIG. 6C-2, the double-face tape 290b has the shape of elongated strip along the two ends 269a and 269b in the longitudinal direction of the light diffusion sheet 260b. The double-faced tape 290c is provided along the ends 269a and 269b of the light diffusion sheet 260 except for the area in which the light refraction sheet 270 is provided. The two double-faced tapes 290c can join the end 269a of the light diffusion sheet 260b to the end 258a of the face sheet 250, and can join the end 269b of the light diffusion sheet 260b to the end 258b of the face sheet 250. The two double-faced tapes 290c can join only the ends 269a and 269b of the light diffusion sheet 260b to the ends 258a and 258b of the face sheet 250. Only the ends are fixed, so that a hollow can be made by the light diffusion sheet 260b and the face sheet 250. It is thus possible to prevent the light diffusion sheet 260a and the light diffusion sheet 260b from pressing against each other.

The double-faced tape 290d is for fixing the reel belt 222 to the end 240 of the opposite reel belt 222 at the time of attaching the reel belt 222 to the reel 220. In FIGS. 6B, 6C-1, 6C-2 and 6D, the double-faced tape 290d is shown in a thick solid line. Fixing to the end 240 makes it possible to wind the reel belt 222 around the reel 220 to attach thereto without forming a gap.

The double-faced tape 290e is for affixing the light diffusion sheets 350 and 360 to the underside surface of the face sheet 250. In FIG. 14C-1, the double-faced tape 290e is shown in a thick solid line.

<Face Sheet 250 and Light Diffusion Sheet 260a>

An adhesive is applied throughout the underside surface (a printing surface SP described below) of the face sheet 250. The adhesive is transparent capable of passing light therethrough. The adhesive can affix the whole of the second surface 264 of the light diffusion sheet 260a to the whole of the underside surface of the face sheet 250. An adhesive is applied throughout the underside surface (a printing surface SP described below) of the face sheet 250, and the second surface 264 of the light diffusion sheet 260a is finished to be smooth. It is thus possible to provide the whole of the second surface 264 of the light diffusion sheet 260a in close contact with the whole of the underside surface of the face sheet 205.

<<Structures of Symbol Forming Area 252 and No-Symbol Forming Area 254>>

Structures of the symbol forming area 252 and the no-symbol forming area 254 will be described below. In the present embodiment, the area in which the symbols 501a and 501b are formed is the symbol forming area 252, and the area in which no symbol is formed is a no-symbol forming area 254.

In the present embodiment, the symbol 501 includes a symbol that a player can visibly recognize, as well as a blank symbol. More specifically, the symbol in the symbol forming area 252 includes a blank symbol. The blank symbol refers to a symbol in which no picture or drawing design is printed on the face sheet 250. It is just have to be one which is used as a symbol at the time of controlling a game in the gaming machine 10. The blank symbol is just needed to be used as a symbol in the control, and may be a symbol relating to a dividend or a symbol not relating to a dividend.

Furthermore, the blank symbol may be a complete blank (blank area) which is visibly recognized that there is no picture such as a pattern at all on the face sheet 250. Furthermore, the blank symbol includes one in which the blank area covers almost all area even if a picture such as a decorating pattern is drawn, or one in which a picture such as a pattern drawn therein has a pale color and thus it is visibly recognized as being a blank area.

Furthermore, in the present embodiment, the no-symbol forming area 254 refers to an area in which a visibly-recognizable symbol and a blank symbol are not formed. It is just necessary for the no-symbol forming area 254 to include no visibly-recognizable symbol or a blank symbol formed therein, and a pattern simply for decoration which is not used for the control may be there.

In addition, in the present embodiment, the area in which the symbols 501c, 501d and 501e are formed has the same structure as that of the no-symbol forming area 254, as described below.

<No-Symbol Forming Area 254 in which No Symbol is Formed>

FIGS. 7A, 7B and 7C are diagrams showing the no-symbol forming area 254 in which no symbol is formed. More specifically, FIG. 7A is a front view showing a surface of the no-symbol forming area 254. FIG. 7B is a transverse cross sectional view showing a cross section of the no-symbol forming area 254 along the cross section L1-L1. FIG. 7C is a vertical cross sectional view showing a cross section of the no-symbol forming area 254 along the cross section B-B. In addition, FIGS. 7B and 7C show the face sheet 250, the light diffusion sheets 260a and 260b and the double-faced tape 290c separate from one another for clearly showing of the structure.

In addition, FIGS. 7B and 7C clearly show the printing surface SP for clearly showing the surface on which a pattern is printed. No symbol is printed on the underside surface of the face sheet 250 because it is the no-symbol forming area 254, nevertheless a pattern is printed thereon. Therefore, the printing surface SP shown in FIGS. 7B and 7C indicates the surface on which a pattern is printed.

As shown in FIG. 7A, no symbol is formed in the no-symbol forming area 254. In the no-symbol forming area 254, the printing surface SP of the underside surface of the face sheet 250 is provided with the light diffusion sheet 260a and the light diffusion sheet 260b laying on each other, as shown in FIGS. 7B and 7C.

As described above, an adhesive is applied throughout the printing surface SP of the face sheet 250. The second surface 264 of the light diffusion sheet 260a is finished to be smooth. The applied adhesive makes it possible to provide the whole of the second surface 264 of the light diffusion sheet 260a in close contact with the underside surface of the face sheet 250.

As shown in FIG. 7B, the no-symbol forming area 254 has the double-faced tapes 290c at each of the two ends 269a and 269b of the face sheet 250 and the light diffusion sheet 260b in the longitudinal direction. As shown in FIG. 6C-2, each of the two double-faced tapes 290c has the elongated shape along the longitudinal direction of the light diffusion sheet 260b (the face sheet 250). Each of the two double-faced tapes 290c makes it possible to provide the ends 269a and 269b of the light diffusion sheet 260b with the ends 258a and 258b of the printing surface SP of the face sheet 250.

Figure 11A:
FIG. 11A is a cross sectional view showing a state where a first surface 262 of a light diffusion sheet 260a faces a first surface 262 of a light diffusion sheet 260b to each other.

As described above, each of the ends 269a and 260b of the first surface 262 of the light diffusion sheet 260b is fixed to the ends 258a and 258b of the printing surface SP of the face sheet 250. On the other hand, the second surface 264 of the light diffusion sheet 260a is fixed to the printing surface SP of the face sheet 250. Therefore, the first surface 262 of the light diffusion sheet 260a faces the first surface 262 of the light diffusion sheet 260b to each other. The projections and depression are formed on the first surface 262. Therefore, as shown in FIGS. 11A to 11C, even if the first surface 262 of the light diffusion sheet 260a and the first surface 262 of the light diffusion sheet 260b come contact with each other, the projections and depressions on each of them form the gaps 266 which makes it possible to prevent the close contact with each other.

Figure 11B:
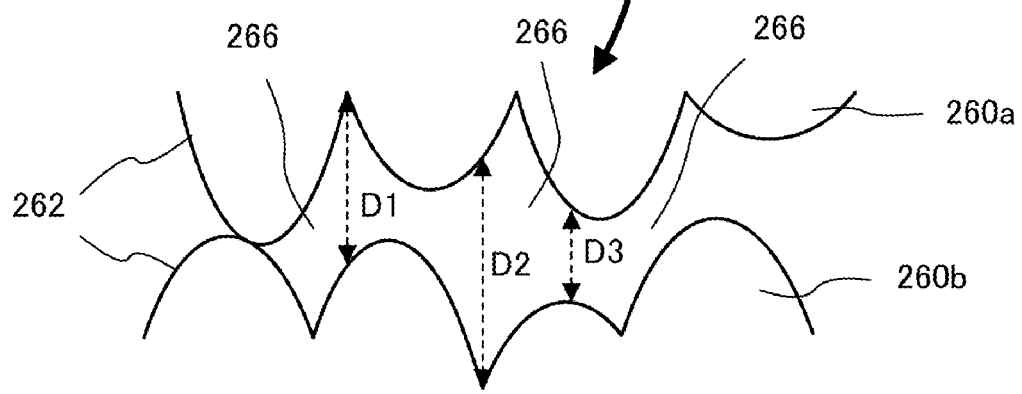
FIG. 11B is a cross sectional view showing a gap 266 formed by projections and depressions.

As shown in FIG. 11B, the gaps 266 are formed between the first surface 262 of the light diffusion sheet 260a and the first surface 262 of the light diffusion sheet 260b. As shown in FIG. 11B, the gaps 266 have the different distances from one another at each of their positions such as distances D1, D2 and D3.

Figure 11C:
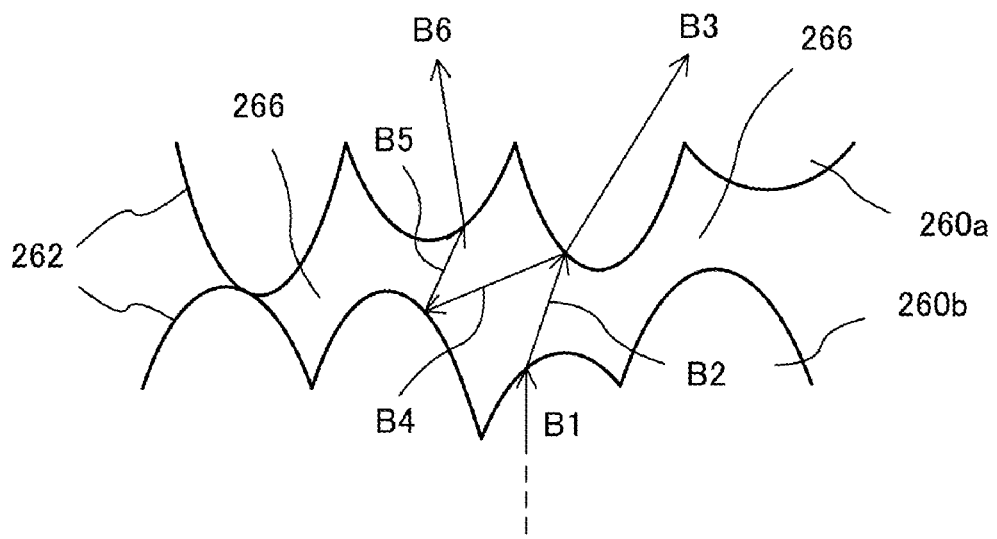
FIG. 11C is a diagram showing a process of refraction and reflection of light at the gap 266.

As shown in FIG. 11C, light B1 emitted from the light source device 304 enters into a second surface 264 (not shown) of the light diffusion sheet 260b, and then is refracted on the first surface 262 of the light diffusion sheet 260b to exit toward the gap 266 as light B2.

The light B2 emitted from the first surface 262 of the light diffusion sheet 260b reaches the first surface 262 of the light diffusion sheet 260a through the gaps 266. The light B2 reached the first surface 262 of the light diffusion sheet 260a is partially refracted, and the residual light is reflected. Refracted light B3 enters into the light diffusion sheet 260a. The light B3 entered into the light diffusion sheet 260a exits from the second surface 264 (not shown) of the light diffusion sheet 260a to illuminate the printing surface SP of the face sheet 250. On the other hand, reflected light B4 reaches the first surface 262 of the light diffusion sheet 260b.

The light B4 reached the first surface 262 of the light diffusion sheet 260b is partially refracted, and the residual light is reflected. Reflected light B5 reaches the first surface 262 of the light diffusion sheet 260a through the gaps 266. The light B5 reached the first surface 262 of the light diffusion sheet 260a is partially refracted, and the residual light is reflected. Refracted light B6 enters into the light diffusion sheet 260a. The light B6 entered into the light diffusion sheet 260a exits form the second surface 264 (not shown) of the light diffusion sheet 260a to illuminate the printing surface SP of the face sheet 250. In this manner, thanks to the formation of the gaps 266, the light B1 emitted from the light source device 304 is refracted in various directions like the light 3 and the light B6.

In this manner, the gaps 266 are formed each of which has the different distance between the first surface 262 of the light diffusion sheet 260a and the first surface 262 of the light diffusion sheet 260b from one another at each of their positions, so that refraction and reflection of light can be repeated in the gap 266. Furthermore, the formation of the gaps 266 makes it possible to ensure the distance in which the light can travel. In this manner, thanks to the formation of the gaps 266, refraction and reflection are repeated and the distance in which the light travels. It is possible to refract and reflect the light in various directions, and resultingly to scatter the light emitted from the light source device 304.

If a single light diffusion sheet 260 is used in the reel belt 222, the gaps 266 are not formed, and thus it is difficult to sufficiently scatter the light emitted from the light source device 304. In contrast, the two light diffusion sheets 260a and 260b are used to arrange the first surface 262 of the light diffusion sheet 260a and the first surface 262 of the light diffusion sheet 260b facing to each other, so that the gaps 266 can be formed. Since the gaps 266 sufficiently scatter the light emitted from the light source device 304, an image of the light source device 304 can become blurred in a wider area. It is thus possible to prevent the image of the light source 304 from being formed on the reel. 220.

As described above, the double-faced tape 290c fixes only the ends 269a and 269b of the light diffusion sheet 260b to the face sheet 250. Therefore, the light diffusion sheet 260a is not fixed to the light diffusion sheet 260b. In this manner, the light diffusion sheet 260a can be displaced with regard to the light diffusion sheet 260b, and also can become resistant to a press by the light diffusion sheet 260b. For example, in the case of attaching the reel belt 222 by winding around the reel 220, the light diffusion sheet 260a and the light diffusion sheet 260b can be smoothly displaced relative to each other. It is thus possible to prevent the light diffusion sheet 260a from coming into close contact with the light diffusion sheet 260b. Therefore, the formation of the gaps 266 can be ensured.

As shown in FIG. 7B, the face sheet 250 has both the first end 258a and the second end 258b. A width between the two ends, the first end 258a and the second end 258b, is W2. The light diffusion sheet 260a has both the first end 268a and the second end 268b. A width between the two ends, the first end 268a and the second end 268b, is W1. The light diffusion sheet 260b has both the first end 29a and the second end 269b. A width between the two ends, the first end 269a and the second end 269b, is W2. The face sheet 250 and the light diffusion sheet 260b have the same width W2 as each other, and the light diffusion sheet 260a has the width W1 which is shorter than the width W2.

In the no-symbol forming area 254 in which no symbol is formed, the first end 258a of the face sheet 250 and the first end 269a of the light diffusion sheet 260b form an end side of the reel belt 222. The end side is fit into the driving-side reel frame body 226. Likewise, the second end 258b of the face sheet 250 and the first end 269b of the light diffusion sheet 260b form an end side of the reel belt 222. The end side is fit into the driven-side reel frame body 228.

While the present embodiment shows the case where the light diffusion sheet 260a has the width W1 that is shorter than the width W2 of the face sheet 250 and the light diffusion sheet 260b, the light diffusion sheet 260a may have the width W2. In this case, the first end 258a of the face sheet 250, the first end 268a of the light diffusion sheet 260a, and the first end 269a of the light diffusion sheet 260b are stacked to one another. Likewise, the first end 258b of the face sheet 250, the first end 268b of the light diffusion sheet 260a, and the first end 269b of the light diffusion sheet 260b are stacked to one another. In this case, the double-faced tape 290c joins the light diffusion sheet 260a to the light diffusion sheet 260b. The first end 258a of the face sheet 250, the first end 268a of the light diffusion sheet 260a and the first end 269a of the light diffusion sheet 260b form one end side of the reel belt 222. Likewise, the first end 258b of the face sheet 250, the first end 268b of the light diffusion sheet 260a and the first end 269b of the light diffusion sheet 260b form other end side of the reel belt 222.

As described above, the adhesive affixes the whole of the second surface 264 of the light diffusion sheet 260a to the whole of the underside surface of the face sheet 250. Furthermore, the double-faced tape 290c affixes the light diffusion sheet 260b to the underside surface of the face sheet 250. In this manner, in the no-symbol forming area 254 in which no symbol is formed, the face sheet 250, the light diffusion sheet 260a and the light diffusion sheet 260b can be integrally molded.

<Area in which the Symbol 501c, the Symbol 501d and the Symbol 501e are Formed>

As described above, the symbol 501c is a symbol showing one "BAR". The symbol 501d is a symbol showing two "BAR". The symbol 501e is a symbol showing three "BAR".

Figure 8A:
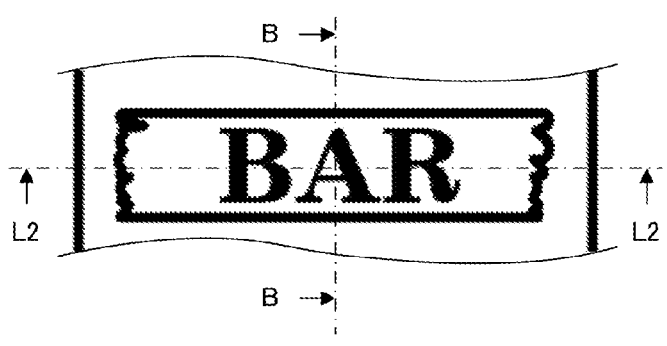
FIGS. 8A, 8B and 8C are diagrams showing an area in which a symbol 501c is formed.
Figure 8C:
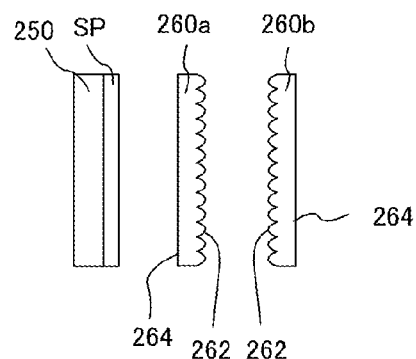
Figure 8B:
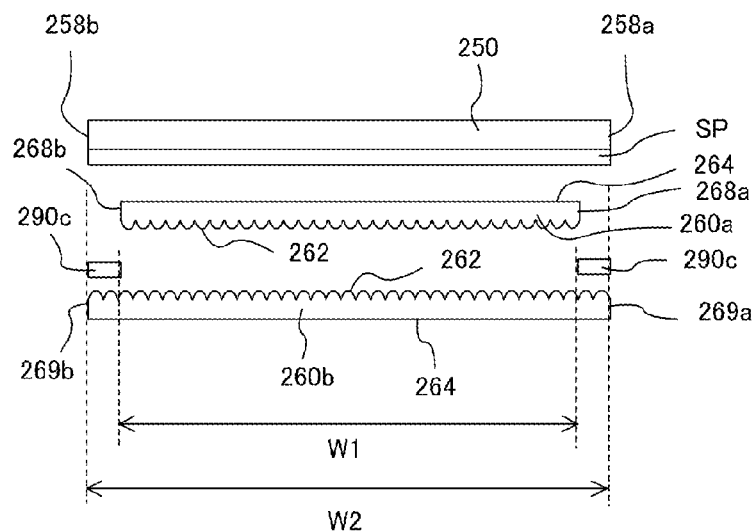

FIGS. 8A, 8B and 8C are diagrams showing an area in which the symbol 501c is formed. More specifically, FIG. 8A is a front view showing a surface of an area in which the symbol 501c is formed. FIG. 8B is a transverse cross sectional view showing a cross section of the area in which the symbol 501c is formed along the cross section L2-L2. FIG. 8C is a vertical cross sectional view showing a cross section of an area in which the symbol 501c is formed along the cross section V2-V2. In addition, FIGS. 8B and 8C show the face sheet 250, the light diffusion sheets 260a and 260b and the double-faced tape 290c separate from one another for clearly showing of the structure.

FIGS. 8B and 8C also clearly show the printing surface SP for clearly showing the surface on which a pattern is printed. A symbol "BAR" is printed on the underside surface of the face sheet 250.

As shown in FIGS. 8A to 8C, although the area in which the symbol 501c, the symbol 501d and the symbol 501e are formed is the area in which a symbol is formed, it has the same structure as that of the no-symbol forming area 254. Therefore, the first surface 262 of the diffusion sheet 260a faces the first surface 262 of the light diffusion sheet 260b to each other. The projections and depressions formed on the first surface 262 of the diffusion sheet 260a and the first surface 262 of the light diffusion sheet 260b form the gaps 266 between the first surface 262 of the light diffusion sheet 260a and the first surface 262 of the light diffusion sheet 260b.

Therefore, it is possible to diffuse light emitted from the light source device 304 even in the area in which the symbol 501c, the symbol 501d and the symbol 501e are formed, similar to the no-symbol forming area 254. In this manner, the image of the light source can become blurred in a wider area, and thus it is possible to prevent the image of the light source from being formed by the light diffusion sheet 260.

<Symbol Forming Area 252 in which Symbol 501a is Formed>

FIGS. 9A, 9B and 9C are diagrams showing the symbol forming area 252 in which the symbol 501c is formed. More specifically, FIG. 9A is a front view showing a surface of the symbol forming area 252. FIG. 9B is a transverse cross sectional view showing a cross section of the symbol forming area 252 along the cross section L3-L3. FIG. 9C is a vertical cross sectional view showing a cross section of the symbol forming area 252 along the cross section B-B. In addition, FIGS. 9B and 9C show the face sheet 250, the light refraction sheet 270, the light diffusion sheets 260a and 260b and the double-faced tape 290c separate from one another for clearly showing of the structure.

FIGS. 9B and 9C also clearly show the printing surface SP for clearly showing the surface on which the symbol 501a is printed. The symbol 501a is printed on the underside surface of the face sheet 250.

As shown in FIG. 9A, the symbol 501a is formed in the symbol forming area 252. As shown in FIGS. 9B and 9C, the printing surface SP on the underside of the face sheet 250 is provided with the light refraction sheet 270.

As shown in FIGS. 9B and 9C, the symbol forming area 252 has the double-faced tapes 290a at each of the two ends 279a and 279b in the longitudinal direction of the face sheet 250 and the light refraction sheet 270, and each of the two ends in the shorter direction thereof. As shown in FIG. 6C-1, the double-faced tape 290a has the shape of winding along the periphery of the symbol 501a. The double-faced tape 290a can fix only the periphery of the first surface 272 of the light refraction sheet 270 to the printing surface SP of the face sheet 250.

As shown in FIG. 12A, the first surface 272 of the light refraction sheet 270 has a plurality of first small areas 274 and a plurality of second small areas 276 formed thereon which are arranged in a staggered configuration. The projections and depression are formed with regularity in the first small areas 274 and the second small areas 276.

The projections and depression formed in the first small area 274 are different from the projections and depression formed in the second small area 276. The direction in which light entered into the first small areas 274 can travel in the different direction from the direction in which the light entered into the second small area 276 travels.

Each of the first small area 274 and the second small area 276 can reflect and refract the light entered thereinto in the direction in accordance with the projections and depressions. The light refraction sheet 270 is arranged laying on the symbol 501a, so that the light entered into the first small area 274 and the second small area 276 can be reflected and refracted in a predetermined direction based on the projections and depressions on the light refraction sheet 270. Therefore, the symbol forming area 252 can be illuminated so as to be different from the no-symbol forming area 254, and thus it is possible to give an accent to the symbol forming area 252 by the light emitted from the light source device 304.

As shown in FIG. 9B, the face sheet 250 has both the first end 258a and the second end 258b. A width between the two ends, the first end 258a and the second end 258b, is W2. The light refraction sheet 270 has both the first end 279a and the second end 279b. A width between the two ends, the first end 279a and the second end 279b, is W2. The face sheet 250 and the light refraction sheet 270 have the same width W2 as each other.

In the symbol forming area 252 in which the symbol 501a is formed, the first end 258a of the face sheet 250 and the end 279a of the light refraction sheet 270 form one end side of the reel belt 222. The end side is fit into the driving-side reel frame body 226. Likewise, the first end 258b of the face sheet 250 and the end 279b of the light refraction sheet 270 form an end side of the reel belt 222. The end side is fit into the driven-side reel frame body 228.

As described above, the double-faced tape 290a affixes the light refraction sheet 270 to the underside surface of the face sheet 250. In this manner, in the symbol forming area 252 in which the symbol 501a is formed, the face sheet 250 and the light refraction sheet 270 can be integrally molded.

<Symbol Forming Area 252 in which the Symbol 501b is Formed>

FIGS. 10A, 10B-1, 10B-2 and 10C are diagrams showing the symbol forming area 252 in which the symbol 501c is formed. More specifically, FIG. 10A is a front view showing a surface of the symbol forming area 252. FIG. 10B-1 is a transverse cross sectional view showing a cross section of the symbol forming area 252 along the cross section L4-L4. FIG.

10B-2 is a transverse cross sectional view showing a cross section of the symbol forming area 252 along the cross section L5-L5. FIG. 10C is a vertical cross sectional view showing a cross section of the symbol forming area 252 along the cross section B-B. In addition, FIGS. 10B-1, 10B-2 and 10C show the face sheet 250, the light refraction sheet 270, the light diffusion sheets 260a and 260b and the double-faced tape 290c separate from one another for clearly showing of the structure.

FIGS. 10B-1, 10B-2 and 10C also clearly show the printing surface SP for clearly showing the surface on which the symbol 501b is printed. The symbol 501b is printed on the underside surface of the face sheet 250.

As shown in FIG. 10A, the symbol 501b is formed in the symbol forming area 252. In the symbol forming area 232, the printing surface SP on the underside of the face sheet 250 is provided with the light refraction sheet 270, as shown in FIGS. 10B-1, 10B-2 and 10C.

As shown in FIGS. 10A to 10C, the symbol forming area 252 in which the symbol 501b is formed has the same structure as the symbol forming area 252 in which the symbol 501a is formed except form the point that a protection sheet 280 is provided.

Therefore, each of the first small area 274 and the second small area 276 can reflect and refract the light entered thereinto in the direction in accordance with the projections and depressions. The light refraction sheet 270 is arranged laying on the symbol 501b, so that the light entered into the first small area 274 and the second small area 276 can be reflected and refracted in a predetermined direction based on the projections and depressions on the light refraction sheet 270. Therefore, the light can be emitted from the symbol forming area 252 so as to be different from the no-symbol forming area 254, and thus it is possible to give an accent by the light to the symbol forming area 252.

In addition, unlike the symbol forming area 252 in which the symbol 501a is formed, the symbol 501b has the shape of a number "7", as shown in FIGS. 10B-1 and 10B-2. Therefore, the light refraction sheet 270 has the width varying in accordance with the shape of a number "7". For this reason, the light diffusion sheets 260a and 260b are arranged around the symbol 501b in accordance with the shape of a number "7". This makes it possible to emit light in accordance with the shape of the symbol 501b.

The protection sheet 280 is a sheet for protecting the light refraction sheet 270 described above. Unlike the symbol 501a, the symbol 501b has the shape of a number 7 which is a complicated geometry. Therefore, the light refraction sheet 270 can be fixed to the face sheet 250 by using the protection sheet 280 in conjunction with the double-faced tape 290b.

<Structure of Reel Belt 222Y>

FIG. 13A is a front view showing a structure of a reel belt 222Y, FIGS. 13B, 13C-1 and 13C-2 are vertical cross sectional views thereof, and FIG. 13D is a backside view thereof.

The reel belt 222Y has five symbols 501a, 501b, 501c, 501d and 501e printed thereon. As shown in FIGS. 13A to 13D, the structure thereof is the same as that of the reel belt 222X except for the order of arrangement of the five symbols 501a, 501b, 501c, 501d and 501e.

<<Structure of Reel Belt 222Z>>

FIG. 14A is a front view showing a structure of a reel belt 222Z, FIGS. 14B, 14C-1 and 14C-2 are vertical cross sectional views thereof, and FIG. 14D is a backside view thereof.

The reel belt 222Z has six symbols 501a, 501b, 501c, 501d, 501e and 501f printed thereon. As shown in FIGS. 14A to 14D, the symbol 501f is printed on the reel belt 222Z. The five residual symbols 501a, 501b, 501c, 501d and 501e have the same structures as those in the reel belt 222X and the reel belt 222Y.

The symbol 501f is a symbol showing a picture of a bird spreading its wings, and characters "CHANCE". As shown in FIGS. 14A to 14D, the area in which the symbol 501f is printed is provided with light diffusion sheets 350 and 360 stacked thereon. Projections and depressions are formed also on the light diffusion sheets 350 and 360. The projections and depressions formed on the light diffusion sheets 350 and 360 have the different shape as that of the projections and depressions formed on the light diffusion sheets 260a and 260b, and the light refraction sheet 270. An effect sheet (LENS manufactured by Three Like Co., Ltd.) and the like can be used as the light diffusion sheet 350. An effect sheet (SHRINKAGE manufactured by Three Like Co., Ltd.) and the like can be used as the light diffusion sheet 360.

The light diffusion sheets 350 and 360 are stacked on the symbol 501f, so that the light can exit so as to be different from the area in which the symbols 501a, 501b, 501c, 501d and 501e are formed and the no-symbol forming area 254.

Figure 15A:
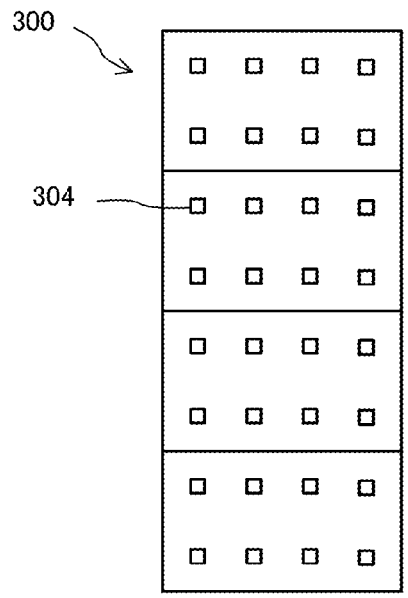
FIG. 15A is a front view showing a backlight device 300.
Figure 15B:
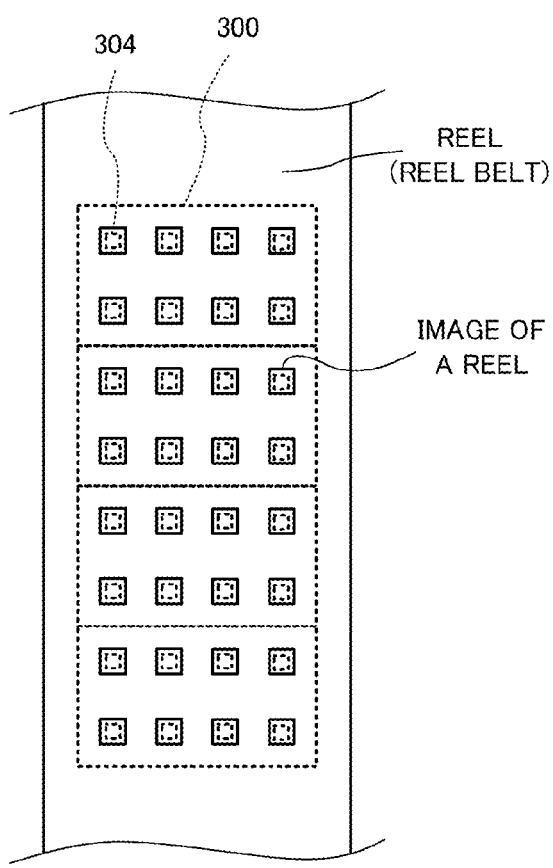
FIG. 15B is a diagram showing a conventional state where an image of light source is formed on the reel belt.
Figure 15C:
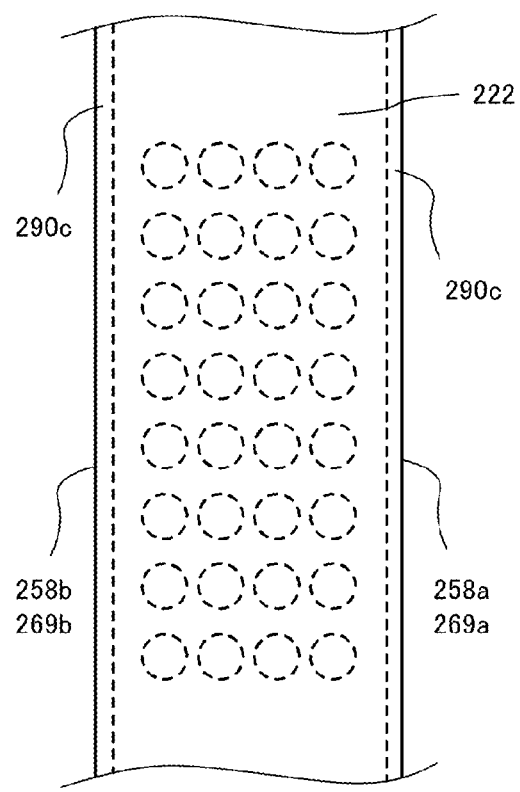
FIG. 15C is a diagram showing a state where the image of the backlight device 300 becomes blurred over a wide area on the reel belt 222.

FIG. 15C is a diagram showing a state where the image of the backlight device 300 becomes blurred over a wide area on the reel belt 222. Rounded broken lines shown in FIG. 15C indicate the area in which light emitted from the backlight device 300 expands.

As described using FIG. 11C, the first surface 262 of the light diffusion sheet 260a and the first surface 262 of the light diffusion sheet 260b are arrange to face each other, so that the gaps 266 can be formed. Since the gaps 266 sufficiently scatter the light emitted from the light source device 304, the image of the light source device 304 can become blurred in a wider area. It is thus possible to prevent the image of the light source 304 from being formed on the reel. 220.

In this manner, the light emitted from the backlight device 300 thus expands in a wider area as indicated by round broken lines when reaching the reel belt 222, as shown in FIG. 15C. This image of the light source device 304 is thus not formed on the reel belt 222.

In addition, the formation of an image of the light source 304 depends on light emission intensity of the light source device 304. The high light emission intensity of the light source device 304 makes it easier to form the image of the light source device 304. In this case, decrease in light emission intensity of the light source device 304, or change in roughness of projections and depressions on the first surface 262 of the light diffusion sheet 260 may be a solution. In this manner, it is thus possible to expand the area in which the light emitted from the backlight device 300 expands (the rounded broken lines in FIG. 15C). The adjacent areas are stacked to each other, and it is thus possible to equalize the brightness in the reel belt 222.

Furthermore, as shown in FIG. 15A, the backlight device 300 has four modules 302, and each of the modules 302 has LEDs as being eight light source devices 304 arranged in matrix.

As shown in FIG. 15C, all of the light source devices 304 arranged in matrix are arranged between two ends, i.e., the first end 258a and the second end 28b, of the face sheet 250, or between two ends, i.e., the first end 269a and the second end 260b, of the light diffusion sheet 260b. As described above, the end 269a of the light diffusion sheet 260b is joined to the end 258a of the face sheet 250, and the end 269b of the light diffusion sheet 260b is joined to the end 258b of the face sheet 250. The light diffusion sheet 260a and the light diffusion sheet 260b come into close contact with each other in the joined area. However, the light source devices 304 arranged in matrix are not arranged in the joined area. Therefore, the image of the light source devices 304 is not formed also in the joined area, and thus the visibility in the reel belt 222 is not decreased.

<Variation>

Figure 16A:
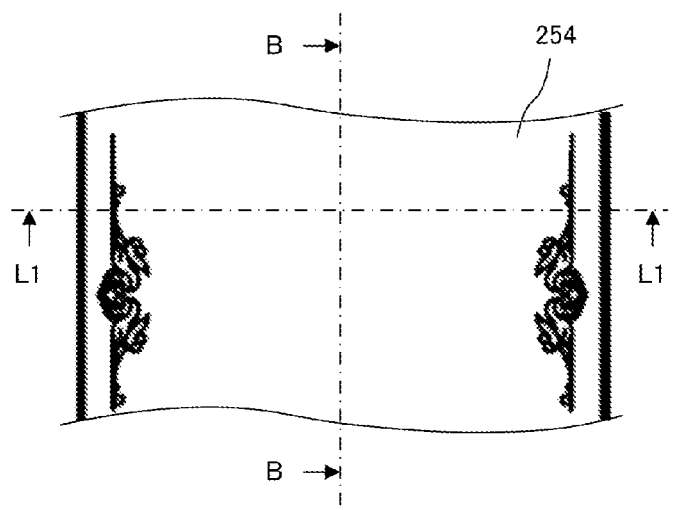
FIGS. 16A, 16B and 16C are diagrams showing a variation of the no-symbol forming area 254.
Figure 16C:
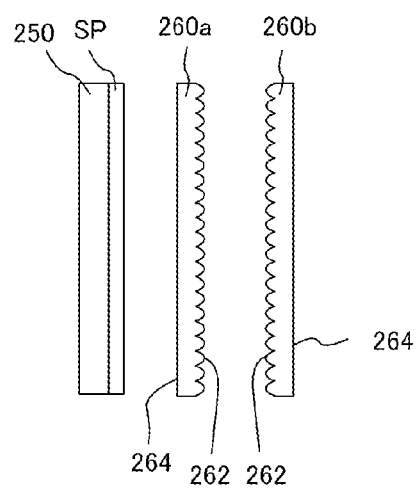
Figure 16B:
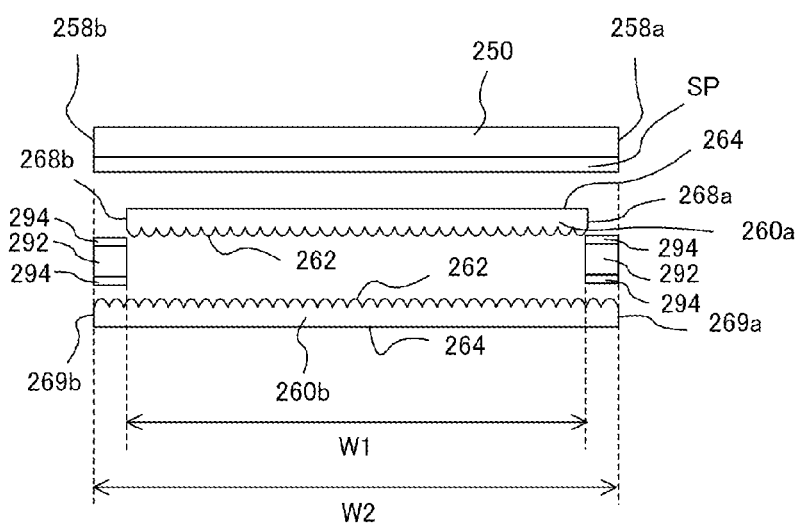

FIGS. 16A, 16B and 16C are diagrams showing a variation of the no-symbol forming area 254. In the example shown in FIG. 7B, the light diffusion sheet 260b and the face sheet 250 are affixed to each other by the double-faced tape 290c. In contrast, in the variation shown in FIGS. 16A to 16C, a spacer 292 and an adhesive 294 affix the light diffusion sheet 260b and the face sheet 250.

The spacer 292 has the elongated shape with a predetermined thickness, and has an upper surface and a lower surface. Furthermore, the spacer 292 is flexible. The adhesive 204 is applied to both the upper surface and the lower surface of the spacer 292, and the light diffusion sheet 260b and the face sheet 250 are affixed to each other by means of the spacer 292.

As described above, the projections and depressions for diffusing light are formed on the first surface 262 of the light diffusion sheet 260b. Since the adhesive 262 is used, the adhesive 294 can be introduced into the projections and depressions on the first surface 262, and thus the spacer 292 can be brought into close contact with the light diffusion sheet 260c without any space. Although using the double-faced tape 290c may generate a gap between the projections and depressions on the light diffusion sheet 260b and the double-faced tape 290c, using the adhesive 294 can bring the spacer 292 into close contact with the light diffusion sheet 260b.

Furthermore, since the spacer 202 having a predetermined thickness is used, the interval can be kept between the face sheet 250 and the light diffusion sheet 260b, and thus it is possible to reliably maintain a hollow state by putting air to be enclosed between the light diffusion sheet 260b and the face sheet 250. Therefore, it is further possible to prevent the light diffusion sheet 260a arranged between the face sheet 250 and the light diffusion sheet 260b from being pressed by the light diffusion sheet 260b. It is also possible to secure the distance of travel of light between the light diffusion sheets 260a and 260b to further improve the light diffusion effect. The thickness of the spacer 292 can be determined as appropriate depending on the thickness of the light diffusion sheet 260a.

The light diffusion sheet 260b may be of course processed in advance to eliminate the projections and depressions on the first surface 262 coming in contact with the double-faced tape 290c. Although the same effect as the case of joining by means of the adhesive can be expected also in this case, the possibility arises where the number of man-hours for such a process increases, thereby increasing the component cost.

Furthermore, regarding the position of providing the spacer 292, while the case in the present variation adopts the structure in which the spacer 292 in the shape of elongated strip is provided along the first end 269a and 269b of the light diffusion sheet 260b, it is not limited to this. For example, a symbol piece for forming a symbol of 7 and the like is sandwiched between the light diffusion sheets 260a and 260b to fix the symbol piece by an adhesive or a double-faced tape, so that the symbol itself (symbol piece) can be used as a spacer.

Second Embodiment

In a second embodiment, reel belt 222S is included as the reel belts 222. This embodiment differs from the first embodiment only in that the reel belt 222S is included, and the other structure in the gaming machine 10 is the same, such as reel device 200 and the backlight device 300.

<<Reel Belt 222S>>

FIG. 17A is a front view showing a surface of the reel belt 222S, FIG. 17B is a side view thereof, FIGS. 17C-1 and 17C-2 are vertical cross sectional views thereof, and FIG. 17D is a backside view thereof. FIG. 17C-1 is a vertical cross sectional view along the cross section A1-A1. FIG. 17C-2 is a vertical cross sectional view along the cross section B2-B2.

<<<Symbol 501>>>

A plurality of types of symbols is printed on each of the reel belt 222S. As shown in FIG. 17A, the reel belt 222S has four symbols 511a, 511b, 511c and 511d printed thereon. The symbol 511a is a symbol having a printed contour of number seven. The symbol 511b is a symbol showing a word of "BAR". The symbol 511c is a symbol showing two words of "BAR". The symbol 511e is a symbol showing three words of "BAR".

The symbols 511a to 511d will be simply referred to as a symbol 511 below if it is not necessary to identify each of them separately. In addition, also in the second embodiment, the symbol 511 includes a blank symbol similar to the first embodiment.

<<Structure of Reel Belt 222S>>

The reel belt 222S has a face sheet 250, a light diffusion sheet 260 and a light refraction sheet 270. The face sheet 250, the light diffusion sheet 260 and the light refraction sheet 270 have the structure same as those in the first embodiment.

<Face Sheet 250>

The face sheet 250 is a transparent and flexible sheet having a shape of elongated strip. For example, the face sheet 250 is preferably made of a PET (polyethylene terephthalate) film.

The symbol 511, patterns and the like are printed on the underside surface of the face sheet 250. The area in which the symbol 511 is printed forms a symbol forming area 252. For example, the symbol 511, patterns and the like can be printed on the underside surface of the face sheet 250 by UV inkjet printing system.

In the second embodiment, the symbol forming area 252 is the area in which the symbol 511a shown in FIG. 17A are formed. Furthermore, the portion on the surface sheet 250 in which the symbols 511a to 511d and patterns are not printed is maintained to be transparent. In the second embodiment, the area in which the symbol 511a is not printed forms a no-symbol forming area 254.

Furthermore, also in the second embodiment, the face sheet 250 has both a first end 258a and a second end 258b (refer to FIG. 7B in the first embodiment). The two ends 258a and 258b are formed along the longitudinal direction of the face sheet 250. The two ends 258a and 258b are formed to be opposite to each other having a distance therebetween.

In addition, also in the second embodiment, both the first end 258a and the second end 258b include an area corresponding to a width of a double-faced tape 290c for use in affixation to the light diffusion sheet 260 by means of the double-faced tape 290c described below (refer to FIG. 17D).

<Light Diffusion Sheet 260>

Similar to the first embodiment, the light diffusion sheet 260 is a translucent and flexible sheet having a shape of elongated strip. The light diffusion sheet 260 is milky white, for example, which is opaque white but translucent. The light diffusion sheet 260 has two surfaces of a first surface 262 and a second surface 264 (refer to the light diffusion sheet 260a or 260b in FIGS. 7B and 7C in the first embodiment).

The light diffusion sheet 260 is preferably made of flexible PVC (plasticized polyvinyl chloride) film. An effect sheet (SPARKLE plasticized polyvinyl chloride available from Three Like Co., Ltd.) and the like can be used as the light diffusion sheet 260, for example.

A plurality of tiny projections and depressions having a predetermined shape is formed on the first surface 262. The projections and depressions are composed of a plurality of convex portions and a plurality of concave portions. The plurality of convex portions and the plurality of concave portions are formed randomly. It is possible to refract and scatter light entered into the first surface 262 of the light diffusion sheet 260 in every directions by randomly forming the plurality of convex portions and the plurality of concave portions. More specifically, it is possible to diffuse light entered into the first surface 262 by the plurality of convex portions and the plurality of concave portions formed randomly.

As described in the first embodiment, the convex portions act as tiny convex lens. Furthermore, the concave portions act as tiny concave lens. The convex portions and the concave portions just have to act as lenses of this kind to diffuse light entered into the first surface 262.

In the second embodiment, it is preferable to randomly diffuse the light entered into the light diffusion sheet 260 by the projections and depressions on the first surface 262 of the light diffusion sheet 260. In this manner, it is possible to blur the image of the light source device 304 in a wide range.

<Light Refraction Sheet 270>

The light refraction sheet 270 is a transparent and flexible sheet having a shape of elongated strip. The light refraction sheet 270 is opaque white but translucent. The light refraction sheet 270 has two surfaces, i.e., a first surface 272 and a second surface 278 (refer to FIG. 9 in the first embodiment). For example, the light refraction sheet 270 is preferably made of flexible PVC (plasticized polyvinyl chloride) film. An effect sheet (BRICK CUBE plasticized polyvinyl chloride available from Three Like Co., Ltd.) and the like can be used as the light refraction sheet 270, for example.

Convex and concave shapes are formed in a regular pattern on the first surface 272 by a plurality of elongated projections, grooves or ridges. For example, it is possible to take the shape in which convex portions are formed in a grid-like pattern, or to take the shape in which concave portions are formed in a grid-like pattern. Each of the grids can take the shape of square or rectangle, as well as rhombus or parallelogram. The projections and depressions are formed in a grid-like shape, so that a plurality of elongated tiny convex and concave portions is aligned in a regular pattern. The projections and depressions on the first surface 272 are not only in a grid-like pattern, but just have to be in a shape with regularity.

Each of the convex and concave portions constituting the projections and depressions acts as a lens such as a cylindrical lens, or acts as a prism. In this manner, the projections and depressions can act as a plurality of elongated tiny lenses or a plurality of elongated tiny prisms aligned in a regular pattern by forming them in a regular pattern. Therefore, similar to the first embodiment, lenses or prisms aligned in a regular pattern can reflect, refract and collect the light entered into the first surface 272 in a predetermined direction based on the projections and depressions.

In the second embodiment, it is preferable that the projections and depressions on the first surface 272 of the light diffusion sheet 270 collects the light entered into the light diffusion sheet 270 in a predetermined direction and at a predetermined angle to form the diffusion pattern. In this manner, it is possible for a player to visibly recognize the diffusion pattern formed on the reel belt 222S.

<Symbol Forming Area 252 in which the Symbol 511a is Formed>

Figure 18:
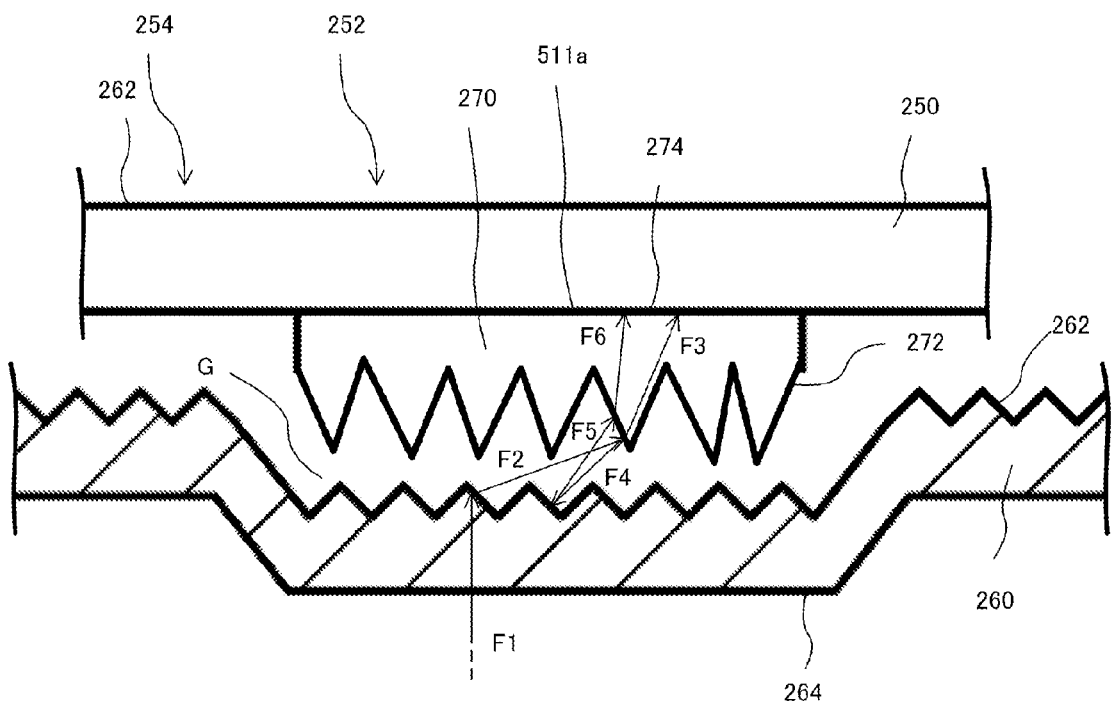
FIG. 18 is an enlarged cross sectional view showing a cross section of the symbol forming area 252 on which a symbol 511a is formed.

FIG. 18 is an enlarged cross sectional view showing diagram showing the cross section of the symbol forming area 252 in which the symbol 511a is formed. As shown in FIG. 18, three types of sheets of the face sheet 250, the light diffusion sheet 260 and the light refraction sheet 270 are stacked in the symbol forming area 252.

The light refraction sheet 270 is formed to have the shape and size same as those of the symbol "7" of the symbol 511a. As shown in FIGS. 17A, 17C-1, 17C-2 and 18, the light refraction sheet 270 is arranged to be stacked in conformity to the position and direction of the symbol "7" so as to be provided inside of the contour of the symbol "7".

As described above, the symbol "7" is printed on the face sheet 250. The light refraction sheet 270 is bonded in the area inside of the symbol "7" which is printed on the face sheet 250. The light refraction sheet 270 has the width varying in accordance with the shape of a number "7". Therefore, the light diffusion sheet 260 is arranged around the symbol 511a in accordance with the shape of the number "7". In this manner, it is possible to emit light in accordance with the shape of the symbol 511a.

The light entered into the light refraction sheet 270 is reflected and refracted in the direction in accordance with the projections and depressions formed on the first surface 272. The light refraction sheet 270 is arranged laying on the symbol 511a, so that the light can be emitted from the symbol forming area 252 so as to be different from the no-symbol forming area 254, and thus it is possible to give an accent to the symbol forming area 252 by the light.

As shown in FIG. 18, gaps G are formed between the first surface 272 of the light diffusion sheet 270 and the first surface 272 of the light diffusion sheet 270. The gaps G have the different distances from one another at each of their positions (refer to the distances D1, D2 and D3 in FIG. 11B).

Light F1 emitted from the light source device 304 enters into a second surface 264 of the light diffusion sheet 260, and then is refracted on the first surface 262 of the light diffusion sheet 260 to exit toward the gap G as light F2.

The light F2 emitted from the first surface 272 of the light diffusion sheet 270 reaches the first surface 272 of the light diffusion sheet 270 through the gaps G. The light F2 reached the first surface 272 of the light diffusion sheet 270 is partially refracted, and the residual light is reflected. Refracted light F3 enters into the light diffusion sheet 270. The light F3 entered into the light diffusion sheet 270 exits form the second surface 274 of the light diffusion sheet 270 to illuminate the printing surface SP of the face sheet 250. On the other hand, reflected light F4 reaches the first surface 262 of the light diffusion sheet 260.

The light F4 reached the first surface 262 of the light diffusion sheet 260b is partially refracted, and the residual light is reflected. Reflected light F5 reaches the first surface 272 of the light diffusion sheet 270 through the gaps G. The light F5 reached the first surface 272 of the light diffusion sheet 270 is partially refracted, and the residual light is reflected. Refracted light F6 enters into the light diffusion sheet 270. The light F6 entered into the light diffusion sheet 270 exits form the second surface 274 of the light diffusion sheet 270 to illuminate the printing surface SP of the face sheet 250. In this manner, thanks to the formation of the gaps G, the light F1 emitted from the light source device 304 is refracted in various directions like the light F3 and the light F6.

In this manner, in the second embodiment, the first surface 262 of the light diffusion sheet 260 and the first surface 272 of the light diffusion sheet 270 are stacked facing to each other. Therefore, the light is diffused by the first surface 262 of the light diffusion sheet 260 in accordance with the projections and depressions on the first surface 262. For example, the light entered into the light diffusion sheet 260 is diffused so as to spread in an area as wide as possible. The light F1 emitted from the light source 304 is diffused so as to spread in a wider area so that the intensity of light becomes more equal by using such a light diffusion sheet 260. Furthermore, it is also possible to blur the image of the light source over a wide area by using the light diffusion sheet 260.

The light F1 reaches the first surface 272 of the light diffusion sheet 270, and the light F3 a part of which is refracted is emitted from the second surface 274 of the light diffusion sheet 270. The light F1 reached the first surface 272 of the light diffusion sheet 270 is diffused by the first surface 272 of the light diffusion sheet 270 in accordance with the projections and depression on the first surface 272 so as to be the diffused light F3. For example, the light entered into the light diffusion sheet 270 is diffused by the projections and depressions on the first surface 272 so as to be easily collected toward a predetermined direction and angle. Such a light diffusion sheet 270 is used, so that a predetermined pattern is formed on the reel 220 by the diffused light F3.

In the second embodiment, two types of different sheets, the light diffusion sheet 260 and the light diffusion sheet 270, are stacked to structure the reel belt 222S. In this manner, the light F1 emitted from the light source 304 is adjusted by the light diffusion sheet 260 so that the intensity of light becomes more equal (light F2). Furthermore, the light F2 entered into the light diffusion sheet 270 can be collected toward the predetermined direction and angle by the light diffusion sheet 270 (diffused light F3) to form a predetermined diffusion pattern. In this manner, the light diffusion sheet 260 previously carries out the adjustment so that the intensity of light becomes more equal before the light enters into the light diffusion sheet 270, so that it is possible to enhance the effect by the light diffusion sheet 270, and to appropriately form the predetermined diffusion pattern.

Furthermore, the gaps G are formed each of which has the different distance between the first surface 272 of the light diffusion sheet 270 and the first surface 272 of the light diffusion sheet 270 from one another at each of their positions, so that refraction and reflection of light can be repeated in the gap G. Furthermore, the formation of the gaps G makes it possible to ensure the distance in which the light can travel. In this manner, thanks to the formation of the gaps G, refraction and reflection are repeated and the distance in which the light travels. It is possible to refract and reflect the light in various directions, and resultingly to scatter the light emitted from the light source 304.

<<Rotation and Stop of the Reel 220, and Visibility of the Symbol 51 and the Diffusion Pattern>>

Figure 19:
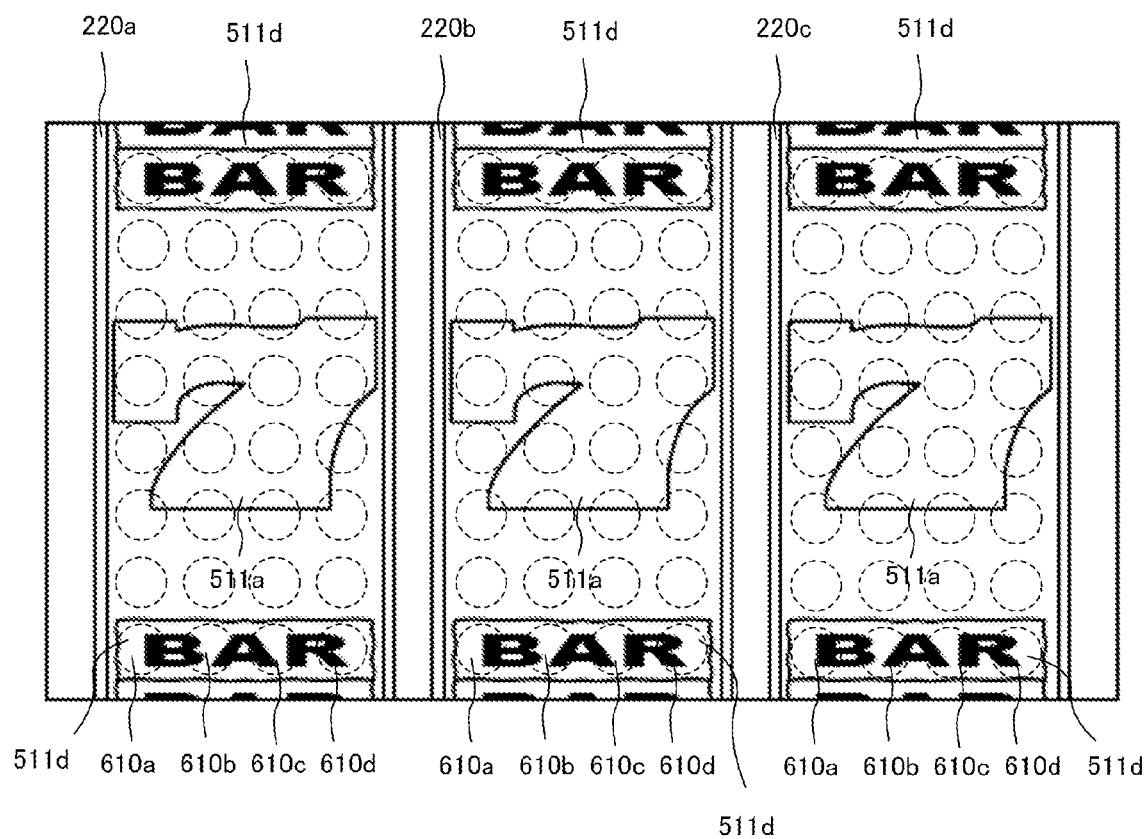
FIG. 19 is a front view showing the state where the reels 220a to 220c are stopped.
Figure 20:
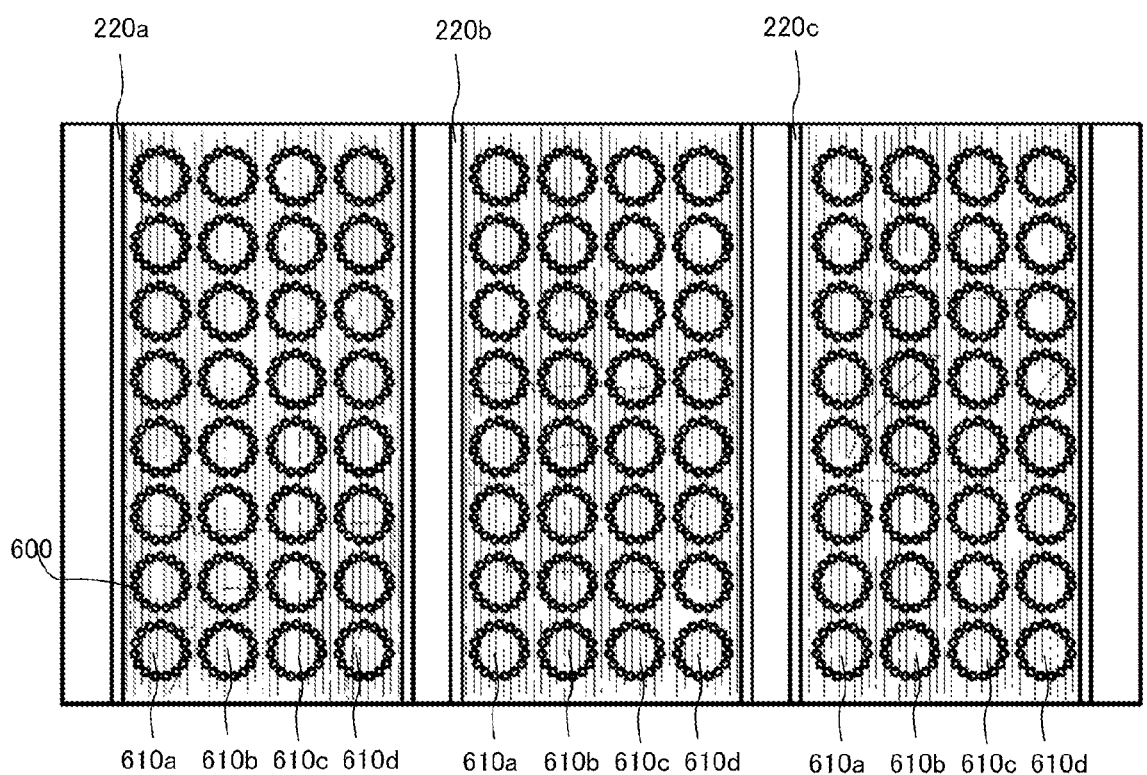
FIG. 20 is a front view showing the state where all the reels 220a to 220c are rotated.

FIG. 19 is a front view showing the state where the reels 220a to 220c are stopped. FIG. 20 is a front view showing the state where all the reels 220a to 220c are rotated. FIG. 21 is a front view showing the state where the reels 220a and 220b are stopped, and the reel 220c is rotated.

Figure 21:
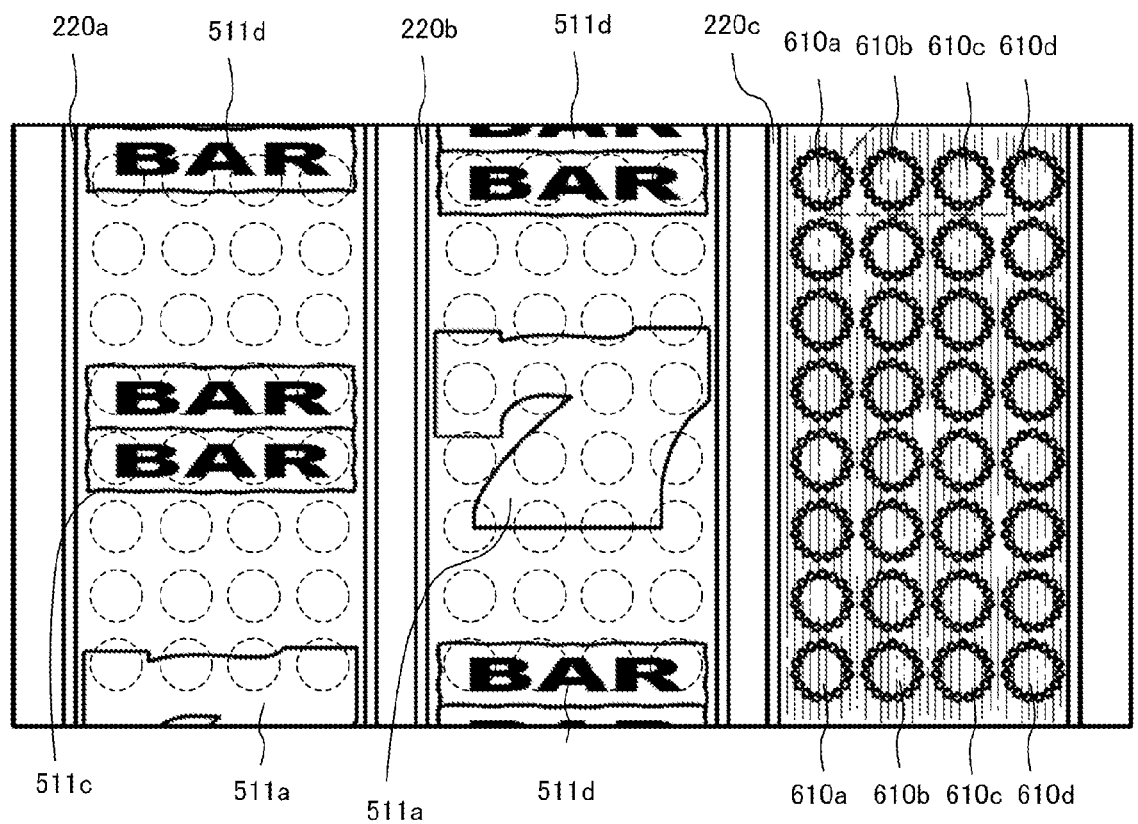
FIG. 21 is a front view showing the state where the reels 220a and 220b are stopped, and the reel 220c is rotated.

In addition as described above, in the second embodiment, although the gaming machine 10 has five reels 220a, 220b, 220c, 220d and 220e similar to the first embodiment, FIGS. 19 to 21 show three reels 220a, 220b and 220c extracted therefrom. The reels 220a, 220b and 220c will be simply referred to as a reel 220 below if it is not necessary to identify each of them separately.

Similar to the first embodiment, the second embodiment has the backlight device 300 as shown in FIG. 5. In the second embodiment, the light source device 304 of the backlight device 300 is controlled by a main CPU (not shown). Furthermore, similar to the first embodiment, the reel unit 202 has a reel angle detection mechanism 208 which outputs a position pulse signal at a predetermined angler unit by the rotation of the reel 220 and also outputs an origin pulse signal for each rotation of the reel 220. The main CPU receives the position pulse signal and the origin pulse signal output from the reel angle detection mechanism 208 to determine whether or not the symbol 511a is passing in front of the light source device 304.

In the second embodiment, the backlight device 300 has four modules 302 as shown in FIG. 5. More specifically, the main CPU determines by the position pulse signal and the origin pulse signal whether or not the symbol is passing in front of any of the module 302 among four modules 302.

Upon determining that the symbol 511a (the symbol forming area 252) is passing in front of any of the modules 302, the main CPU transmits a control signal for lighting the module 302 concerned to the backlight device 300. In this manner, it is possible to light the light source device 304 of the module 302 among the four modules 302 in front of which the symbol 511a is passing.

Furthermore, upon determining that the symbol 511a (the symbol forming area 252) is not passing in front of any of the modules 302, the main CPU transmits a control signal for extinguishing the module 302 concerned to the backlight device 300. In this manner, it is possible to extinguish the light source device 304 of the module 302 among the four modules 302 in front of which the symbol 511a is not passing.

The control is carried out in this manner, so that only the module 302 in front of which the symbol 511a is passing is lighted and the residual modules 302 are extinguished when the symbol 511a is passing in front of four modules 302. In accordance with the passage of the symbol 511a by the rotation of the reel 220, it is possible to light and extinguish four modules 302 in an alternate fashion.

Furthermore, as described above, two types of different sheets, the light diffusion sheet 260 and the light diffusion sheet 270, are stacked in the symbol forming area 252, so that it is possible to form the diffusion pattern. The diffusion pattern is formed on the reel 220 by the light emitted from the light source device 304. As shown in FIG. 3, the light source device 204 (the backlight device 300) is provided at a given position. Therefore, when the light is emitted from the light source device 304, the diffusion pattern always appears in a given position without moving by the rotation and stop of the reel.

In addition, in the no-symbol forming area 254, only the light diffusion sheet 260 is provided and the light diffusion sheet 270 is not provided. Therefore, the diffusion pattern is never formed.

As shown in FIG. 5, the backlight device 300 has four modules 302. Each of the modules 302 has eight light source devices 304 (LEDs) in total which are arranged four in the lateral direction and eight in the longitudinal direction. As the backlight device 300 as a whole, 32 light source devices 304 are arranged in total with four in the lateral direction and eight in the longitudinal direction.

As described above, the four modules 302 are controlled by the main CPU as being a controller for each module 302. More specifically, the main CPU controls the lighting and extinguishing of the four modules 302 in turn so as to be lighted upon the symbol 511a in relation to the winning overlaps with the module 302 concerned by the rotation of the reel 220, whereas extinguished upon the symbol 511a does not overlap with the module 302.

However, since the symbol 511a moves at a high speed from top down in front of the module 302 by the rotation of the reel 220, the player can visibly recognize as if all the light source devices 304 of all the modules 302 are lighted, as shown in FIG. 20 below. More specifically, all the light source devices 304 are lighted, so that 32 ring patterns 610 are displayed on the reel 220.

In this manner, the gaming machine of the second embodiment can form two types of state, the first state and the second state. The first state is the state where the reel 220 is stopped in which the drawing pattern of a plurality of symbols 511 is displayed (can be visibly recognized) including the symbol 511a formed by printing on the reel belt 222S. On the other hand, the second state is the state where the reel 220 is rotated in which the drawing pattern of a plurality of symbols 511 is not displayed (is difficult to be visibly recognized) including the symbol 511a formed by printing on the reel belt 222S, and the other drawing pattern (such as the ring pattern 610 and the like) formed of a group of a plurality of light source device 304 is displayed (can be visibly recognized) by lighting all of 32 light source devices 304.

Therefore, it is possible to appropriately display the other drawing pattern such as the ring pattern formed on the reel belt 222S to be visibly recognized by the plurality of (32) light source devices 304 (the number of the light source is not limited in the present invention). For example, such a drawing pattern is diversified by changing the layout pattern of the light source devices 304. It is thus possible to achieve a variety of colors by using colored light sources which emit light in a variety of colors as the light source devices 304.

The position where the diffusion pattern is formed is determined in accordance with the light source devices 304. For example, as shown in FIG. 20, a plurality of ring-shaped diffusion patterns (hereinafter referred to as a ring pattern 610) is formed on the reel 220. One ring pattern 610 is formed at a given position by one light source device 304. The diffusion pattern will be described below.

The symbol 511 is printed on the reel belt 222S, and moves along with the rotation movement of the reel 220. Therefore, it is difficult for a player to visibly recognize the symbol 511 even if the light source device 304 is lighted while the reel 220 is rotated, whereas it is easy for a player to visibly recognize the symbol 511 when the reel 220 is stopped.

The visibility of the symbol 511 and the diffusion pattern will be described below with reference to FIGS. 19 to 21. In addition, FIGS. 19 to 21 are diagrams showing the state where a player visibly recognizes the three reels 220a, 220b and 220c.

All of 32 light source devices 304 is lighted in the state shown in FIG. 19 where the reel 220 is stopped. The light emitted from the light source devices 304 illuminates the symbol 511 such as the stopped symbol 511a. Furthermore, even in the state where the reel 220 is stopped, the light emitted from the light source devices 304 forms the ring pattern 610 at a given position on the reel 220 by the symbol forming area 252 of the symbol 511a. As shown in FIG. 19, 32 ring patterns 610 in total with four in the lateral direction (the ring patterns 610a, 610b, 610c and 610d) and eight in the longitudinal direction are formed on each of three reels 220a, 220b and 220c. In addition, as described below, since the symbol 511 can be visibly recognized clearer than the ring pattern 610, 32 ring patterns 610 are depicted by broken lines in FIG. 19. Those 32 ring patterns 610 correspond to the arrangement of 32 light source devices 304 (refer to FIG. 5).

As described above, since the ring pattern 610 always appears at a given position irrespective of the movement of the reel 220, it appears at a given position while the light source device 304 is lighted even if the reel 220 is stopped. Furthermore, since the symbol 511a is stopped when the reel is stopped, the symbol 511a overlaps with the diffusion pattern. However, since characters and drawing patterns constituting the symbol 511a are clearly displayed when the symbol 511a is stopped, it becomes easier for the player to visibly recognize the diffusion pattern rather than the symbol as shown in FIG. 19. In this manner, the symbol 511a resultingly becomes more observable than the symbol when the reel is rotated.

Next, as shown in FIG. 20, the symbol moves downward from the upper side in the state where the three reels 220a, 220b and 220c are rotated. The movement of the symbol 511a makes it difficult for the player to visibly recognize the symbol 511 such as the symbol 511a.

As described above, each time the symbol 511a (the symbol forming area 252) passes through the display window 150, the module 302 (the light source device 304) is controlled to be lighted and extinguished repeatedly so as to follow the symbol 511a. Then, since the speed of passing the symbol 511a through the display window 150 is high to the extent that the visibility of the symbol 511a becomes lower than the visibility of the 32 light source devices 304 described above, all of 32 light source devices 304 controlled the lighting so as to follow the symbol 511a is visibly recognized as if they are lighted as shown in FIG. 20.

In the case where the symbol 511a (the symbol forming area 252) does not pass in front of the light source device 304, all of 32 light source devices 304 is extinguished. In the case where the symbol 511a is passing in front of the light source device 304, the light source devices 304 are lighted. The ring pattern 610 is thus formed on the reel 220 by the operation of the light diffusion sheets 260 and 270. As shown in FIG. 20, 32 ring patterns 610 in total with four in the lateral direction and eight in the longitudinal direction are formed to be visibly recognized on each of three reels 220a, 220b and 220c. The ring pattern 610 always appears in a given position without moving by the rotation and stop of the reel 220. More specifically, it appears in the position same as 32 ring patters 610 shown by broken lines in FIG. 19. As described above, the lighting and extinguishing of 32 light source devices 304 are controlled in sequence so as to follow the symbol 511a, and the player visibly recognizes as if all of 32 ring patterns 610 are formed for each of the three reels 220a to 220c as shown in FIG. 20.

As shown in FIG. 20, one ring pattern 610 is composed of a group of 15 small bright circles formed along a circumference of circle 600. The ring pattern 610 is formed by collecting light by the projections and depressions on the first surface 272 of the light refraction sheet 270.

Those 32 ring patterns 610 correspond to the arrangement of the 32 light source devices 304 (refer to FIG. 5). One light source device 304 forms one ring pattern 610.

In this manner, the ring pattern 610 is formed by the light source device 304, so that each of the ring patterns 610 is always generated at a given position. Therefore, it becomes easier for the player to visibly recognize the ring pattern 610 generated at a given position rather than the symbol 511.

When the symbol 511a is passing in front of the light source 304, the light source device 304 is lighted. On the other hand, when the symbol 511a does not pass in front of the light source 304, the light source device 304 is extinguished. In this manner, the ring pattern 610 is generated and cleared based on the passage of the symbol 511a.

The ring pattern 610 is generated and cleared based on the passage of the symbol 511a. However, the ring pattern 610 is formed by the light emitted from the light source 304, so that the position of the generated ring pattern 610 is always same. It is thus easier for the player to visibly recognize the ring pattern 610 generated at a given position rather than the moving symbol 511a.

As shown in FIG. 21, the reel 220a and 220b are stopped and the reel 220c is rotated. In the stopped reels 220a and 220b, it becomes easier to visibly recognize the symbol 511 than the ring pattern 601, similar to FIG. 19. On the other hand, in the rotated reel 220c, it becomes easier to visibly recognize the ring pattern 601 than the symbol 511, similar to FIG. 20.

As described above, the shape of the ring pattern 610 can be determined by the combination of the light diffusion sheet and the light refraction sheet such as the light diffusion sheet 260 and the light refraction sheet 270. On the other hand, the number and position of the ring pattern 610 can be determined in accordance with the number and position of the light source device 340.

In the second embodiment described above, 32 light source devices 304 are used which are arranged in a matrix state as shown in FIG. 5 in the first embodiment. However, the light source devices 304 may be arranged tailored to the contour of the symbol. For example, the plurality of light source devices 304 may be arranged so as to be along the character of "7" of the symbol 511a. In this manner, it is possible to form the diffusion pattern tailored to the contour of the symbol.

In this manner, the second embodiment may be able to make the player visibly recognize not the symbol itself but a light emission pattern different from the symbol by the light emitted from the backlight device 300 when the reel 220 is rotated. The light emission pattern may have the aspect same as or different from the symbol.

Yet further, it is preferable that the gaming machine according to the second embodiment is further provided with a front light (not shown) which illuminates the reel 220 form the outside. The front light is provided on the upper side and the lower side of the display window 150 to emit light toward the depth of the reel device 200. The light is emitted from the front light, so that it is possible to illuminate the reel 220 even in the case where the backlight is extinguished. The reel 220 and the symbol 511 thus can be visibly recognized easily.

What is claimed is:

1. A reel belt attached to a rotatable reel of a gaming machine, comprising:
   a first light diffusion sheet with translucency having a light refraction surface including a surface formed thereon for refracting light passing therethrough in various directions, the first light diffusion sheet stacked on a base sheet; and
   a second light diffusion sheet having a light refraction surface, the second light diffusion sheet stacked on the first light diffusion sheet;
   wherein each of the light refraction surfaces formed on the first and second light diffusion sheets has projections and depressions on the respective surface thereof for refracting light; and
   said light refraction surface of said first light diffusion sheet faces said light refraction surface of said second light diffusion sheet.

2. The reel belt according to claim 1, wherein:
   said base sheet and said second light diffusion sheet have both ends formed along the longitudinal direction; and
   a hollow is formed by joining both the ends of said base sheet and both the ends of said second light diffusion sheet opposite to each other, the base sheet and the second light diffusion sheet stacked to each other.

3. The reel belt according to claim 1, wherein:
   both the ends of said first light diffusion sheet have a first width along the direction perpendicular to the longitudinal direction;
   both the ends of said second light diffusion sheet include two ends formed in the longitudinal direction to be opposite to each other having a distance therebetween, and have a second width along the direction perpendicular to the longitudinal direction, the second width wider than said first width; and
   said first light diffusion sheet is arranged between both the ends of said second light diffusion sheet.

4. The reel belt according to claim 1, further comprising a light refraction sheet with translucency having another light refraction surface for refracting light passing therethrough in a manner that is different from the manner in which the light refraction surfaces formed on the first and second light diffusion sheets refract light, the light refraction sheet stacked on a symbol forming area on said base sheet including a symbol formed thereon.

5. The reel belt according to claim 4, wherein said another light refraction surface has projections and depressions different from those on the light refraction surfaces formed on the first and second light diffusion sheets.

6. A gaming machine comprising a reel assembly having a rotatable reel and a backlight illuminating said reel from the inside, wherein:
   said reel has a reel belt, comprising:
      a first light diffusion sheet with translucency having a light refraction surface including a surface formed thereon for refracting light emitted from the backlight in various directions, the first light diffusion sheet stacked on a base sheet; and
      a second light diffusion sheet having a light refraction surface, the second light diffusion sheet stacked on said first light diffusion sheet;
      wherein each of the light refraction surfaces formed on the first and second light diffusion sheets has projections and depressions on the respective surface thereof for refracting light; and
      said light refraction surface of said first light diffusion sheet faces said light refraction surface of said second light diffusion sheet.

7. The gaming machine according to claim 6, wherein:
   said base sheet and said second light diffusion sheet have both ends formed along the longitudinal direction;
   a hollow is formed by joining both the ends of said base sheet and both the ends of said second light diffusion sheet opposite to each other, the base sheet and the second light diffusion sheet stacked to each other; and
   said backlight is arranged between said both the ends.

8. The gaming machine according to claim 7, wherein said base sheet and said second light diffusion sheet are joined by an adhesive.

9. The gaming machine according to claim 6, wherein said second light diffusion sheet has a light refraction surface same as the light refraction surface of said first light diffusion sheet.

10. The gaming machine according to claim 6, wherein said second light diffusion sheet has a light refraction surface with translucency, the light refraction surface different from said light refraction surface of said first light diffusion sheet.

11. The gaming machine according to claim 10, wherein said second light diffusion sheet is stacked on the symbol forming area on said base sheet including a symbol formed thereon.

12. The gaming machine according to claim 11, wherein:
   light emitted from the backlight is diffused by said first light diffusion sheet and said second light diffusion sheet to form diffused light with a diffusion pattern, thereby illuminating said reel belt;

rotation of said reel provides a first state where visible recognition of said diffusion pattern is made easier than the visible recognition of said symbol; and stop of said reel provides a second state where visible recognition of said symbol is made easier than the visible recognition of said diffusion pattern.

\* \* \* \* \*